United States Patent [19]
Mangat et al.

[11] Patent Number: 6,081,814
[45] Date of Patent: Jun. 27, 2000

[54] DOCUMENT REFERENCE ENVIRONMENT MANAGER

[75] Inventors: Satwinder S. Mangat, Orem; Wayne Taylor, Provo; Steven G. Mahlum, Orem, all of Utah

[73] Assignee: Novell, Inc., Provo, Utah

[21] Appl. No.: 08/888,464

[22] Filed: Jul. 7, 1997

[51] Int. Cl.[7] .............................. G06F 17/30; G06F 15/00
[52] U.S. Cl. ................. 707/501; 707/100; 707/1
[58] Field of Search ........................... 707/200, 100–104, 707/1–7, 516, 515, 526, 500–504; 364/130

[56] References Cited

U.S. PATENT DOCUMENTS

| | | | |
|---|---|---|---|
| 5,220,625 | 6/1993 | Hatakeyama et al. | 382/54 |
| 5,519,857 | 5/1996 | Kato et al. | 395/600 |

*Primary Examiner*—Joseph H. Feild
*Assistant Examiner*—Alford W. Kindred
*Attorney, Agent, or Firm*—Madson & Metcalf

[57] ABSTRACT

A reference environment manager may create, modify, and access multiple environments, each containing certain references related in a manner of significance to a user. References may be entries referring to documents, provided by any suitable means. A user may create an environment and select references for inclusion therein from a list, such as a hit list provided by a conventional or a special purposes browser with an associated search engine. A catalog of environments may store entries identifying individual environments. A catalog may be navigated by a browser, to identify an environment. An environment may be so navigated, to identify a reference, as may directory services objects, associated with a document, in a directory services tree. Information may be available therein to determine whether to retrieve an entire document. A single browser may provide all browsing (search/review/navigation) functions. A directory services system may store catalog objects listing reference environments. Indirection may be provided by having catalogs listing reference environment objects, each pointing to a reference environment "outside" the directory services tree, subdividing and improving access and maintenance tasks.

21 Claims, 13 Drawing Sheets

DOCUMENT REFERENCE ENVIRONMENT MANAGER

BACKGROUND

1. The Field of the Invention

This invention relates to computer applications using or requiring access to documents and files and, more particularly, to novel systems and methods for retrieving and linking documents or files.

2. The Background Art

Internetworks are networks of networks. For example, a wide area network (WAN) of local area networks (LANS) and other WANS is an internetwork. Internetworks may be public or private. The internet, the worldwide web, and the like are examples of internetworks.

Applications executing on a computer typically require access to one or more documents, files, databases, and the like. When a user browses, for example, the worldwide web, or various internet locations, certain documents may be found. A search engine may return a hit list from a search across an internetwork or across a directory services system.

However, the information in each listing in an environment is extremely meager. The hit list contains, typically, only address information. Thus, a user has precious little information on which to evaluate each of the hits.

The environment available is a single environment. A single environment is typically available for storing a list of all documents of a user with their address information. Different documents may be related to one another in distinct ways. Multiple environments, each containing a collection of documents related together in some way, is not typically available. Creating and searching a list or catalog of environments is not available, but could be very useful. Searching across multiple environments for a particular document referenced therein is virtually unheard of, but would be valuable. No search engine exists for traversing a reference environment searching for a particular document. Such a system, with even this rudimentary yet unavailable ability, would be very useful.

Moreover, a flat list of references in a single environment is all that a user has available, typically. A bookmark list, available in a conventional browser, is one example. A suitable group of reference environments, which may then be grouped in a hierarchy, is needed. A reference environment structure to hold references that can be organized, sorted, filtered, or otherwise arranged in a hierarchy is needed as well.

A document may be any addressable data structure. For example, data blocks, applications, files, records, databases, fields, executables, and the like may all be thought of as documents. A reference entry in a list or table may be considered to be a document referring to a document. Documents are not always static entities. A user may access, through an application, a document or file (generically referred to as a document, regardless of format) only occasionally, compared to another user.

Moreover, an indirection method would be valuable, but is unavailable for effectively searching for additional information beyond an address. Typical browsers may return addresses of servers or nodes at which desired information is found in an internetwork. Such addresses are listed as hits, in a chronological list (environment) as they are found. However only a hit location is identified, then only by address, in a hit list in an environment. A system of pointers providing indirection to documents, as well as their source sites, through a more stable, searchable, manageable, intermediate reference is desirable.

Directory services systems have been implemented in many networks. A directory services system may include a database of objects linked in a hierarchy establishing relationships therebetween. Directory services databases may be created to define and manage information related to an organization. Likewise, directory services databases may include information on software, hardware systems, assets, financial data, personnel, property, inventory, and the like.

Directory services databases are based on trees of (hierarchically related) objects and are well understood in the art. A software object may be thought of as a data structure encapsulating both executables (e.g. methods) and operational data (attributes) supporting or used by the executables. Software objects and object-oriented programming are well understood in the art.

Directory services systems, also called network directory services, typically provide engines for inputting, linking, outputting, searching, updating, and the like, all of the objects within a directory services database. Certain standard functions available from directory services systems are well established. Services may include support for object structures, including attributes and methods (executables) related to those attributes, database management of contained objects, as well as user interfaces for providing inputs and obtaining outputs.

What is needed is a method and apparatus for defining, tracking, updating, searching, and the like, multiple catalogs, each catalog containing multiple environments, and each environment containing multiple references to documents. Certain features of a directory services system need to be accessed by a reference environment management system for navigating hit lists available from other browsers, in order to extract useful link information, and download additional documents and document linking information. In addition, a creation, management, and browsing method and apparatus are needed for creating and maintaining multiple environments, and document lists within those environments.

BRIEF SUMMARY AND OBJECTS OF THE INVENTION

In view of the foregoing, it is a primary object of the present invention to provide a method and apparatus for creating, maintaining, and searching entries, referring to documents, listed in an environment, entries referring to environments in a list of environments, catalogs containing lists of multiple environments, and catalogs of catalogs, across a local area network, an internetwork, or across a directory services system.

It is an object of the invention to provide a new type of directory services object that may be used to provide reference environment management of lists of documents or links accessed by users.

It is an object of the invention to provide a linking mechanism available with or without a directory services system, for creating multiple reference environments, filling data structures in the reference environments with document data to form useful lists of documents, and for searching the environments to locate desirable documents.

It is an object of the invention to provide an apparatus and method to broadly navigate, browse, or search over an internetwork or a directory services system until a particular document of interest is found, and to sort, filter, and save selected document information in one or more of multiple environments readily accessible, reviewable, and searchable by a user.

It is an object of the invention to provide a standardized query data structure for rapidly defining and executing queries over one or more environments in search of a document.

Consistent with the foregoing objects, and in accordance with the invention as embodied and broadly described herein, a method and apparatus are disclosed in one embodiment of the present invention as including data structures, including executables and operational data, for creating, maintaining, and searching multiple environments, especially over a network. Each environment contains lists of entries, each entry identifying information corresponding to documents associated with the environment.

An apparatus and method in accordance with the invention may store reference environments as objects in a directory services tree. Catalogs of reference environments, or catalog objects (inside or outside of a directory services system) may store lists of multiple reference environments. Catalogs of catalogs (whether objects or not) may be created and stored.

Where directory services are available, a reference environment catalog object may be one type of directory services object pointing to multiple reference environments. The reference environments may be inside or outside of the directory services system.

A reference environment need not be a directory services object, yet may still be accessed therefrom. In one embodiment, indirection may be provided between a directory services object and a reference environment. For example, a location object may be listed in a catalog or catalog object in a directory services system. The location object may point to a reference environment outside of the directory services system. Thus, the directory services system need not maintain the comparatively local reference environment, but may rely on a local utility program to maintain the reference environment.

Accordingly, relatively rapidly changing information about documents may be stored in a document location table as one embodiment of a reference environment. Meanwhile, the reference environment (e.g. document location table) may be available indirectly through a relatively slowly changing catalog object in a directory services system.

Multiple environments may be created for storing document lists, each created for a specific purpose and having some property or characteristic related thereto in common. Query data, for example, may be stored as key words in the environment. Such information may be stored as attributes of the environment, shared by all documents identified therein, or may be stored with particular documents' information in the environment.

A reference environment manager may be provided for creating and modifying environments. The reference environment manager may also provide editing or modification of the document lists within environments. A catalog (e.g. catalog object) may contain a list of reference environments. The reference environment manager may include a search engine for searching a catalog to find a particular environment. Likewise, the reference environment manager may include a search engine for searching a document list in an environment.

Alternatively, a conventional browser may be used with an interface to the reference environment manager. The interface may support searches for reference environments (e.g. without a catalog, or using a catalog, if available), searches for documents listed in a reference environment entry, and searches for documents to be listed in a reference environment.

In addition, certain new data structures may be provided to enhance creation, management, and searching of multiple reference environments. For example, a catalog of reference environments may be stored. The catalog may be stored in a local file management system or on a network file system that may or may not leverage a directory services system. A reference environment catalog object may be created and stored in a directory services system.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 10 is a schematic block diagram of one embodiment of a method for creating a reference environment of FIG. 4A;

DETAILED DESCRIPTION OF THE PREFERRED EMBODIMENTS

It will be readily understood that the components of the present invention, as generally described and illustrated in FIGS. 1–16 herein, could be arranged and designed in a wide variety of different configurations. Thus, the following more detailed description of the embodiments of the system and method of the present invention, as represented in FIGS. 1 through 16, is not intended to limit the scope of the invention, as claimed, but is merely representative of the presently preferred embodiments of the invention.

Figure 1:
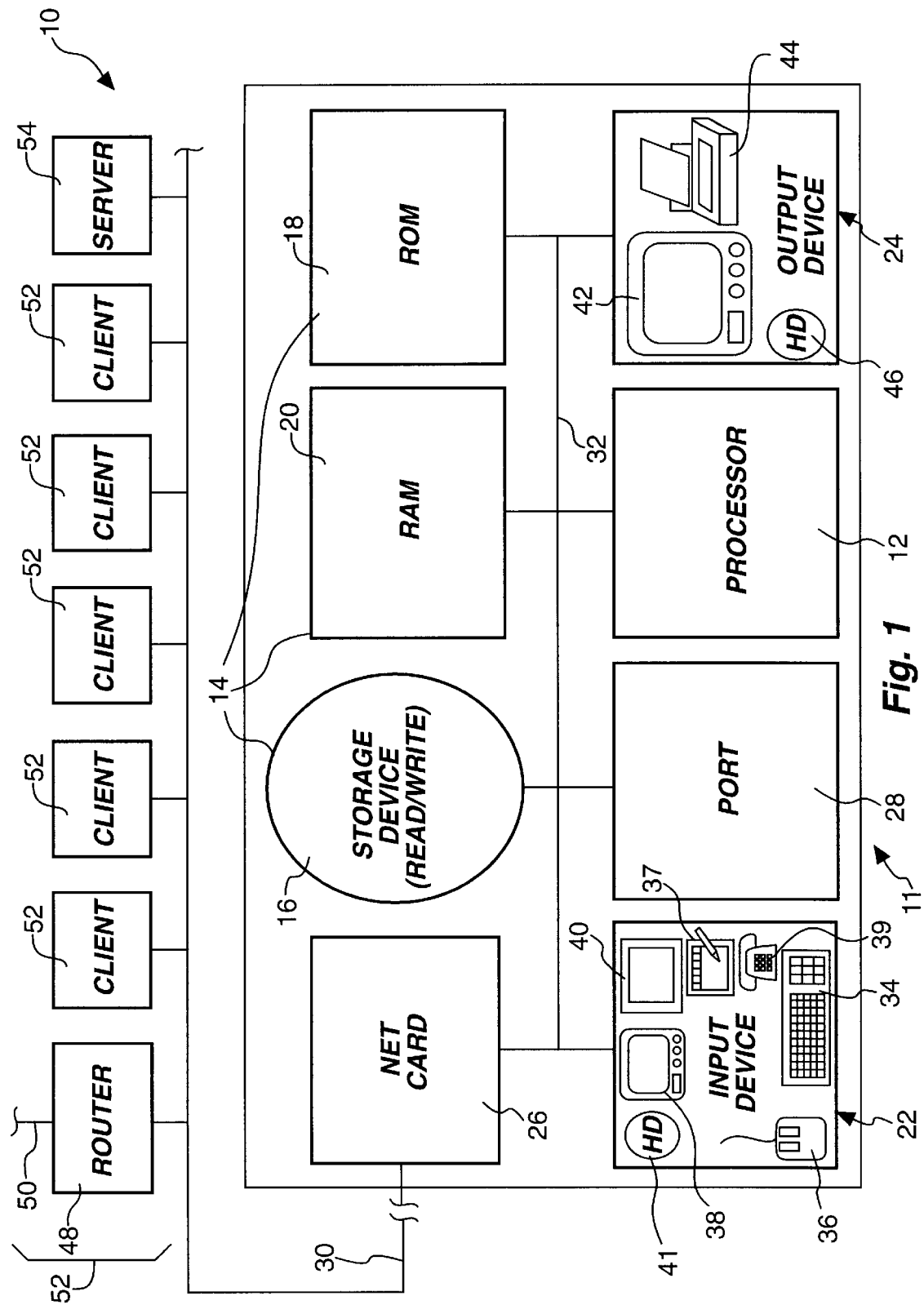
FIG. 1 is a schematic block diagram of one embodiment, of an apparatus for implementing a reference environment, management system over a network to support multiple environments, in accordance with the invention.
Figure 2:
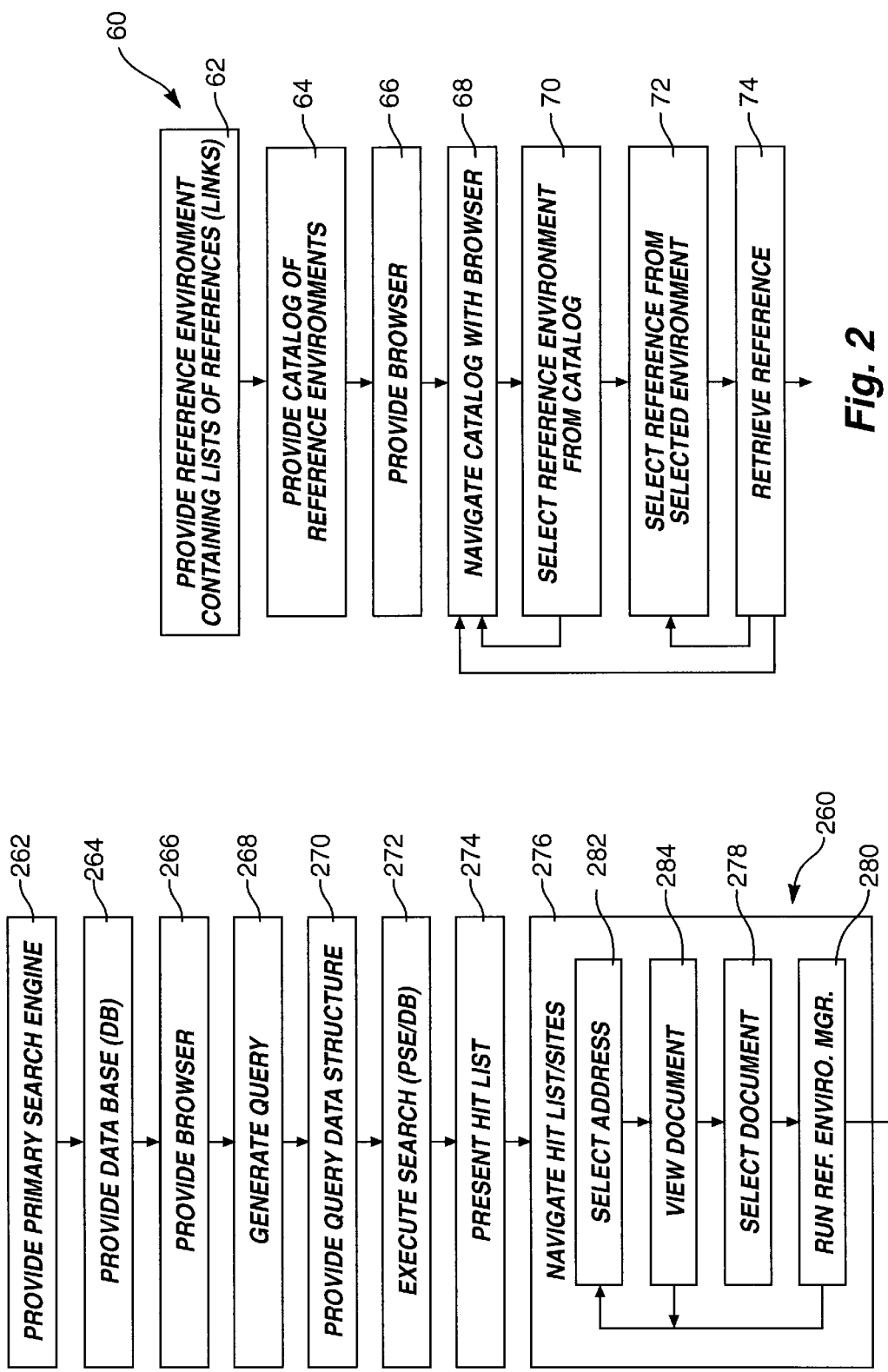
FIG. 2 is a schematic block diagram of one embodiment of a method for searching a reference environment to retrieve a reference (e.g. document)

The presently preferred embodiments of the invention will be best understood by reference to the drawings, wherein like parts are designated by like numerals throughout. FIG. 1 illustrates an apparatus for implementing a method in accordance with the invention on one or more computers in a network. FIG. 2 illustrates a method for providing and using multiple reference environments.

FIGS. 3–8 illustrate data structures that may be stored in memory on various computers within a network to support reference environment management, and includes objects for implementing methods in accordance with the invention. FIGS. 9–12 illustrate embodiments methods or processes implementing steps to create, manage, and search multiple environments over a network, each environment including a list of references, and being managed by a reference environment manager.

Figure 13:
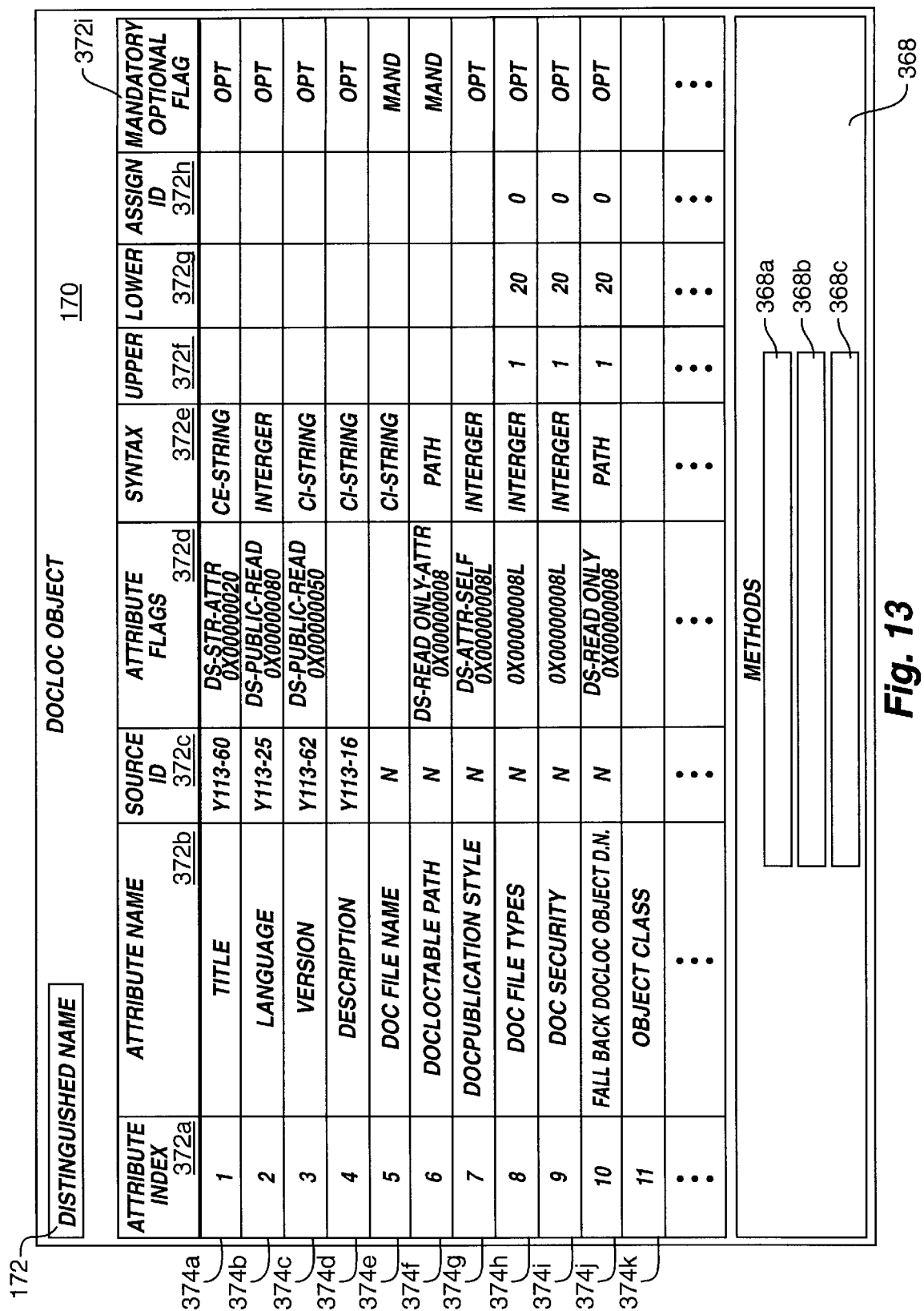
FIG. 13 is a schematic block diagram of a docloc object consistent with the invention and suitable for inclusion in a network directory services system adapted to implement the methods and apparatus of the invention.
Figure 14:
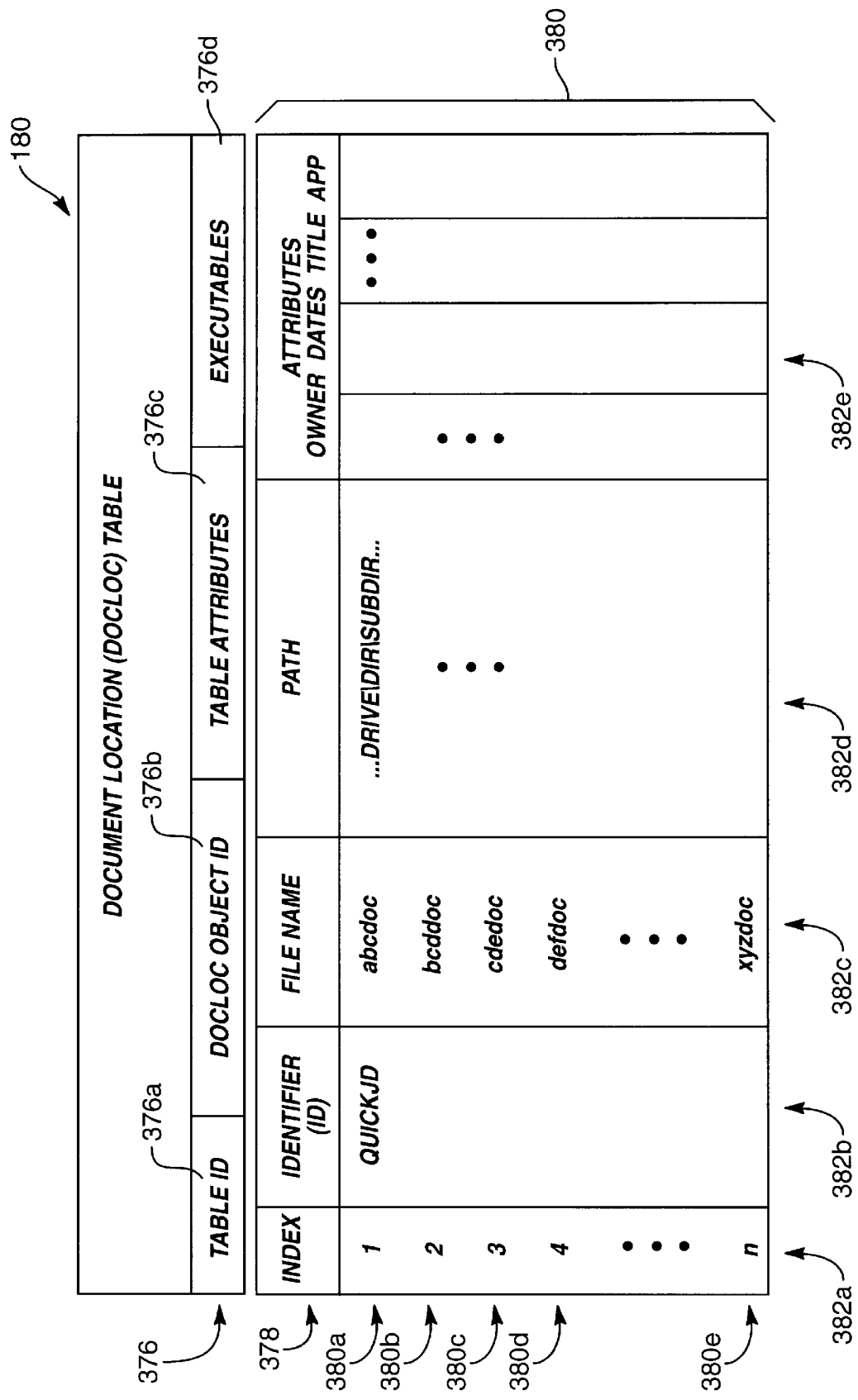
FIG. 14 is a schematic block diagram of one embodiment of a document location table or docloc table that may store document information accessible, through indirection, from the docloc object of FIG. 13.

FIG. 13 illustrates one embodiment of a document location object (Docloc Object) suitable for inclusion in a directory services system to point to a document or a document location table, providing indirection and infrastructural support from a directory services system. FIG. 14 illustrates one embodiment of a document location table suitable for correspondence with a docloc object of FIG. 13. The docloc table of FIG. 14 may be stored outside a directory services system.

Figure 3:
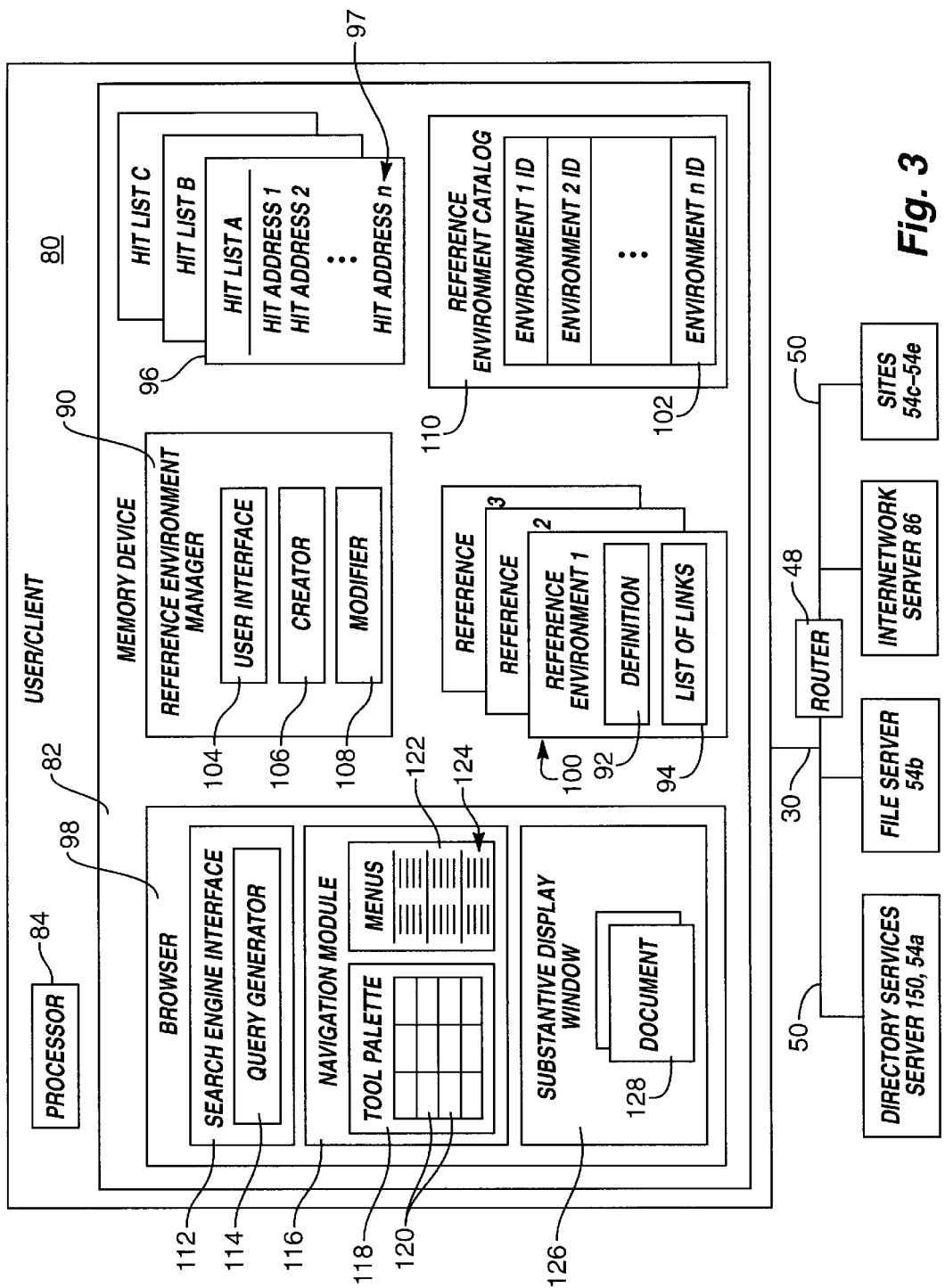
FIG. 3 is a schematic block diagram of one embodiment of the reference environment manager and other data structures contained in the memory devices of a user or client computer, to access a directory service, server, or an internetwork server, to search various sites for documents to be listed in one of multiple reference environments.
Figure 4A:
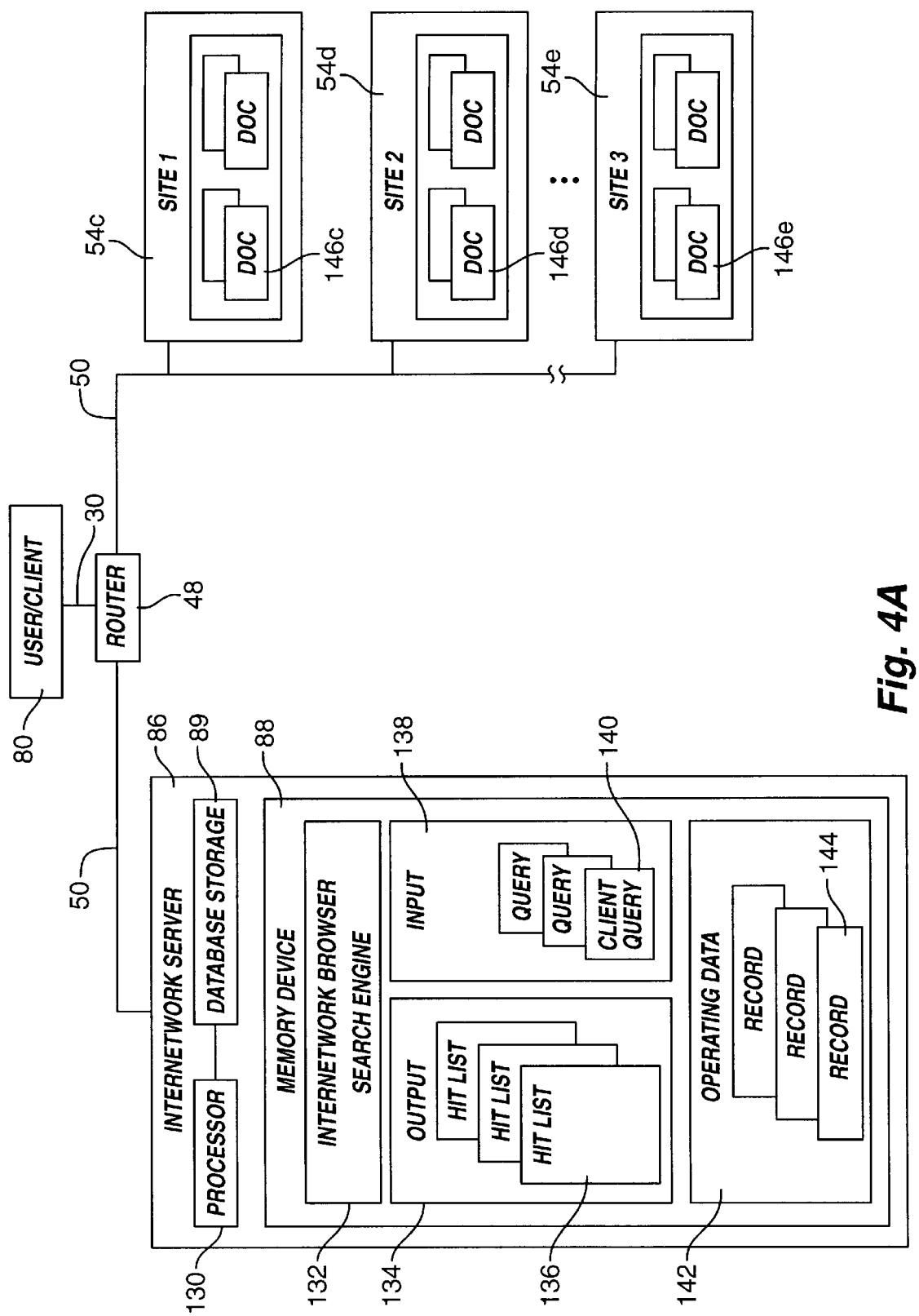
FIG. 4A and 4B are schematic block diagrams of data structures effective to support a reference environment manager of FIG. 3 in accordance with the invention using either any internetwork or a directory services system, respectively.
Figure 4B:
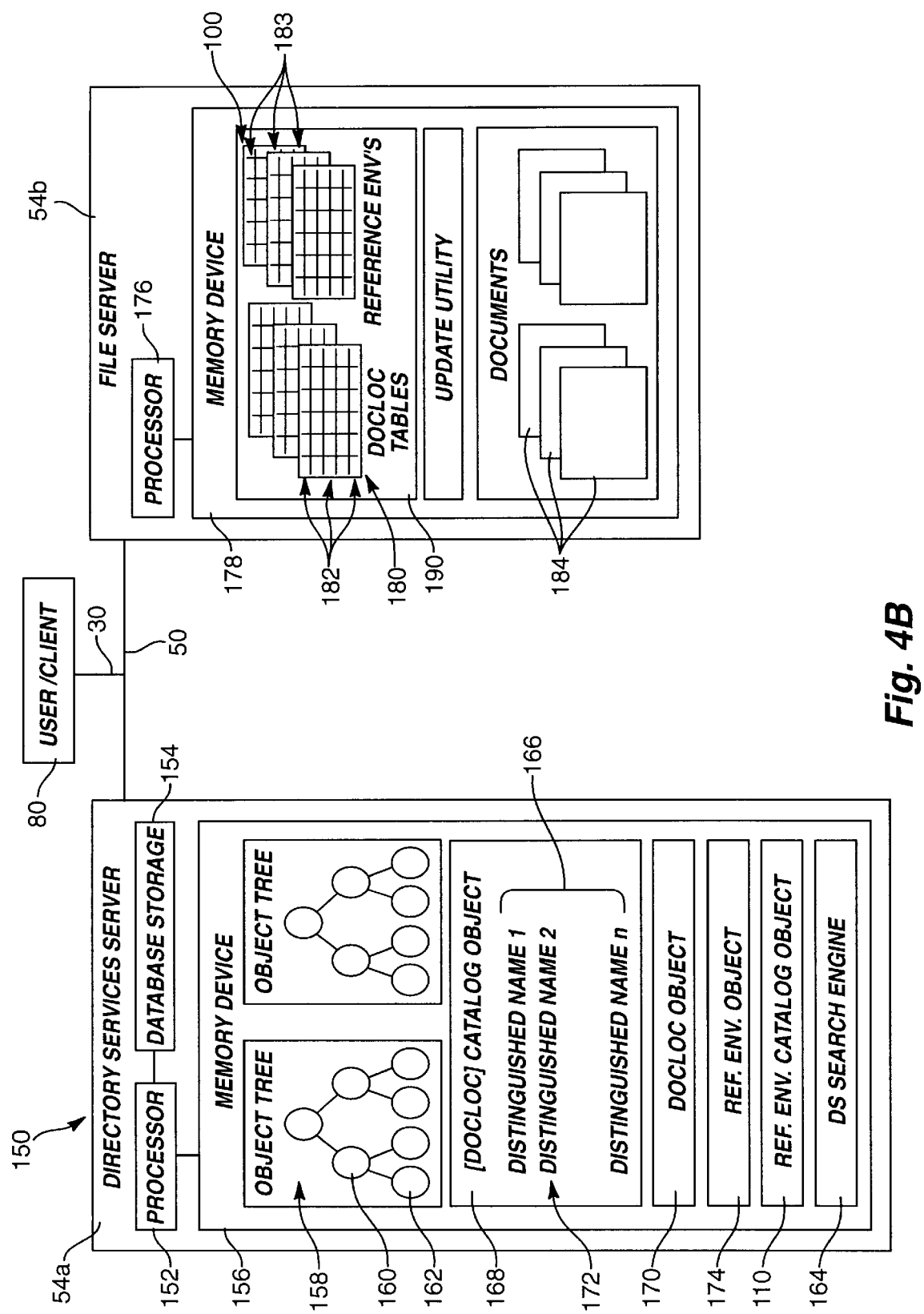
Figures 5, 6:
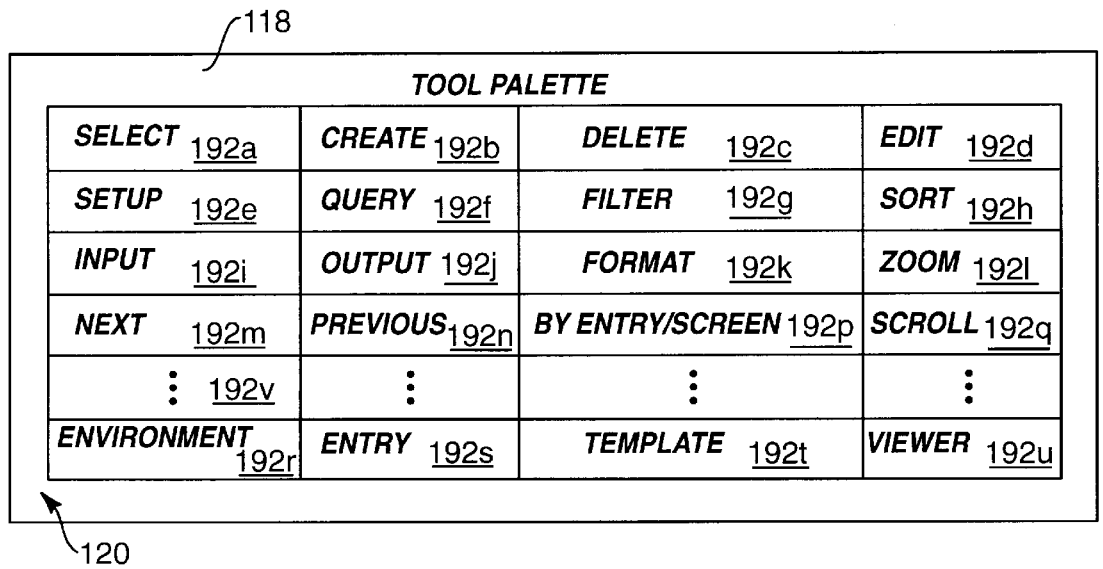
FIG. 5 is a schematic block diagram of one embodiment of a tool palette to be provided as part of a navigation module in the apparatus, methods, and data structures of FIGS. 1–4.
FIG. 6 is a schematic block diagram of one embodiment of a reference list (where a reference entry may be considered to be a document referring to a document, and a document may be any addressable data structure) suitable for inclusion in a reference environment of FIGS. 2–4.
Figure 15:
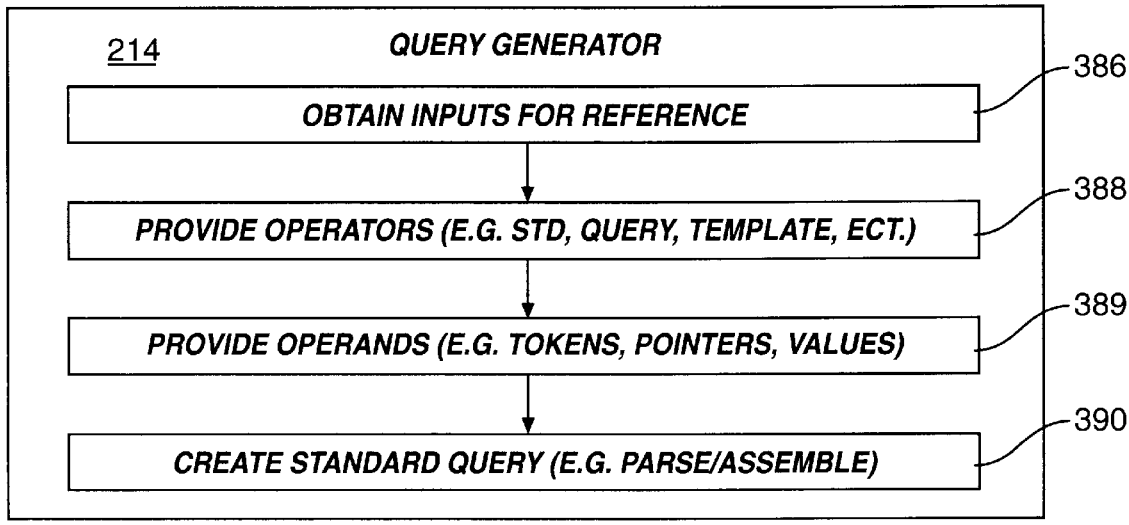
FIG. 15 is a schematic block diagram of one embodiment of a query generator module illustrating steps for creation of a query consistent with the invention.
Figure 16:
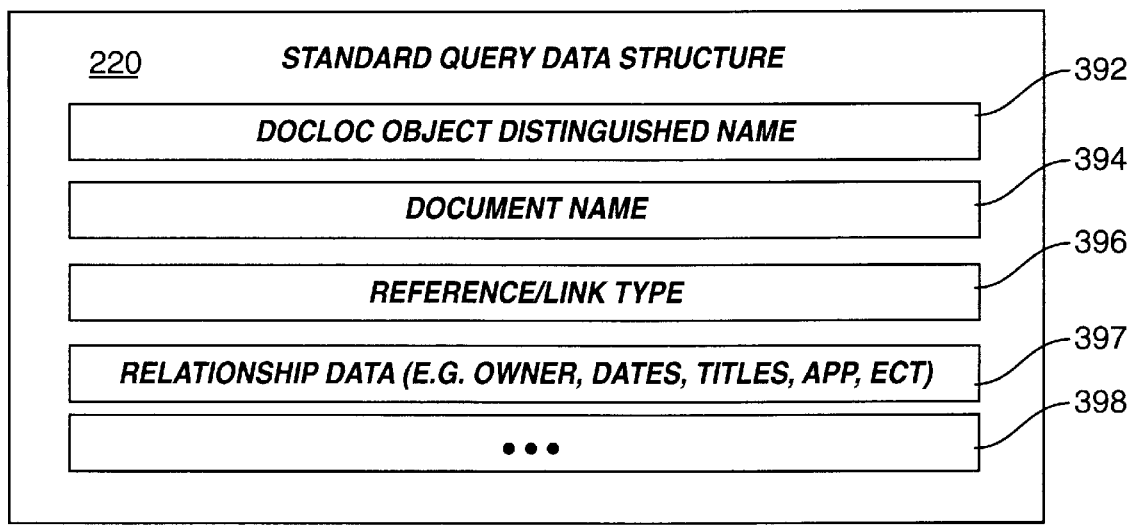
FIG. 16 is a schematic block diagram of one embodiment of a standard query data structure consistent with the invention and provided by the query generator of FIG. 15.

The docloc table 180 may correspond to, be, include, exclude, or exist in addition to, the reference environment of FIG. 3, with its reference list of FIG. 6. This is true also of the docloc object of FIGS. 4a and 13, with respect to the reference environment object of FIGS. 3 and 4B. Similarly it is true of the docloc catalog object of FIG. 4B, with respect to any reference catalog object of 4B. Thus these corresponding structures illustrate embodiments of each other. FIGS. 15–16 illustrate certain embodiments of a query generator and a standard query data structure to support a reference environment manager.

Referring to FIG. 1, an apparatus 10 may implement the invention on one or more nodes 11, (client 11, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telephone line 39, may be used for communication with other devices, users, or the like. Similarly, a scanner 40 may be used to receive graphical inputs which may or may not be translated to other character formats. A memory device 41 of any type (e.g. hard drive, floppy, etc.) may be used as an input device, whether resident within the node 11 or some other node 52 on the network 30, or from another network 50.

Output devices 24 may likewise include one or more physical hardware units. For example, in general, the port 28 may be used to accept inputs and send outputs from the node 11. A monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. In general, herein, any node 11, 52 accessible to obtain information or files may be referred to as a server. Thus, a "web site" available to users of an internetwork 50 may be thought of as a server 54, serving whatever it serves. Other special functions, including communications, applications, directory services, and the like may be implemented by an individual server 54 or multiple servers 54. An node 11, 52 may be a server 54.

In general, a node 11 may need to communicate over a network 30 with a server 54, a router 48, or other nodes 52.

Similarly, a node 11 may need to communicate over another network (e.g. like or unlike the network 30) in an internetwork 50 connecting with nodes 52 remote from the network 30. Likewise, individual components 12–46 may need to communicate data with one another. A communication link may exist, in general, between any pair of devices.

Referring to FIG. 2, a method 60 provides use of a managed reference environment. The method 60 or process 60 may include a provide reference environment step 62, provide catalog step 64, and provide browser step 66. Thereafter, a navigate step 68, select reference environment step 70, and select reference step 72, may be executed. Finally, a retrieve reference step 74 may obtain the document or other item identified by the select step 72.

The process 60 may be implemented in any of several suitable embodiments to operate in the system 10 or apparatus 10 of FIG. 1. In one presently preferred embodiment, the provide reference environment step 62 provides a reference environment containing a list of references. The step 62 may be completed independently by a provider. Alternatively, the provide step 62 may be completed by a remote vendor or user for local use. The provide step 62 may be completed on a local system 11, local with respect to a user. Alternatively, the provide step 62 may be completed on a server 54 located remotely from a local station 11 over an internetwork 50 or network 30. Importantly, multiple reference environments may be provided from one or more sources.

Multiple reference environments may be listed in a catalog. The provide catalog step 64 may be completed in any suitable format. In one embodiment, the provide catalog step may result in a file listing references in a reference environment. In another embodiment, a catalog object may be provided 64 within a directory services system.

A provide browser step 66 provides a search and browsing tool for navigating (e.g. search, view select, open, etc.) catalogs, reference environments, listed documents, or all the foregoing. Step 66 may be completed by any suitable means. In one embodiment, the provide browser step 66 may result in any suitable prior art browser available. In one presently preferred embodiment, the provide browser step 66 results in a browser capable of searching over a network through multiple environments for a document. Moreover, the provide browser step 66 may result in a system for navigating a directory services system to find objects pointing to catalogs, reference environments, and references listed in environments. The order of the provide reference environment step 62, provide catalog step 64 and provide browser step 66 is unimportant. Nevertheless, in one presently preferred embodiment, each of the steps 62, 64, 66, is completed prior to a navigate step 68.

In one embodiment, a navigate catalog step 68, or navigate step 68, may rely on a browser provided by the provide browser step 66 to search, view or evaluate, and select one or more catalogs available from the provide catalog step 64, and one or more reference environments listed in such catalogs as outputs of the provide reference environment step 62. In general, the navigate catalog step 68 may include navigation of an internetwork in search of catalogs, navigating catalogs in search of suitable reference environments, navigation of reference environments in search of a particular document listed or otherwise identified therein, or all of the foregoing.

A select reference environment step 70, or select step 70, may provide a mechanism for selecting 70 a reference environment temporarily or permanently. Typically, temporary selection 70 may involve browsing, viewing, review, evaluating, and the like. Viewing, evaluating, and the like may involve user interaction or may be completed automatically by an executable programmed for that purpose. An executable may be from a single command to a large, complex application that may control the processor 12.

Permanent selection 70 may include selection of a reference environment to be permanently identified in a collection of reference environments (e.g. a catalog), or the like. Similarly, permanent selection 70 of a reference environment may involve opening a reference environment in order to further search or navigate within the reference environment, or even redefine the reference environment.

The select reference step 72 selects a reference listed in a reference environment. The reference may then be used for further action by a user. The select step 72 may be similar to the select reference environment step 70. The select reference environment step 70 may be nested within the navigate step 68. Similarly, the select reference step 72 may be nested within the select step 70. Likewise, the result of the select reference step 72 may be either relatively temporary or permanent, as discussed above, and for the same or similar reasons.

A retrieve reference step 74 may return the referenced document itself. The retrieve step 74 may provide data from a listing in a reference environment, the actual document listed, or both. As a practical matter, a user may browse the reference environment entries in detail, and may select a document referenced thereby, such as for viewing or retrieval, all within a step 74. The step 74 may be nested within the select reference step 72. Likewise, the retrieve reference step 74 may provide either temporary or permanent retrieval, or both.

When a retrieve reference step 74 results in retrieval of a reference identified in a reference environment provided by the select step 70, the reference may include any practical number of data structures (e.g. records, fields, etc.). For clearly identifying and, optionally, evaluating a reference, the retrieve step 74 may include accessing a remote node 52 or server 54 over a network 30, 50. The retrieve step 74 may involve retrieving an entire document, key information about a document, or sequential retrieval 74 of portions of the document. Thus, browsing or saving may be facilitated.

Referring to FIGS. 3, 4A, and 4B specifically, but in view of FIGS. 1 and 4A–8, an apparatus 10 may rely on interactions between a user station 80 or client station 80, internetwork node 86 (e.g. server 86), and various sites 54. Note that each trailing alphabetical character following a reference numeral indicates a particular instance of an item identified by a reference numeral. Thus, the sites 54 include, for example, sites 54*c,* 54*d,* 54*e*. Also note that the sites 54 are treated as servers since they may contain documents available to a user at a node 11, 52.

In one embodiment, a user station 80 (e.g. one embodiment of a node 11, 52) includes a suitable memory device 82 storing data structures to be executed or used by a processor 84. Similarly, an internetwork server 86 includes a suitable memory device 88 storing executables, data, or both. Certain services of the server 86 may be available to the user station 80 over the networks 30, 50 through the router 48.

A reference environment manager 90 executable from the memory device 82 may create, manage, and support searching of definitions 92 and document lists 94 (e.g. reference lists 94, list 94 of entries, or lists 94 of links to documents) for reference environments 100.

The document lists 94 may be created from hit lists 96 provided from any suitable browser 98. Nevertheless, in certain embodiments, the browser 98 may operate either with, or as an included part of, the reference environment manager 90 to support creation, management, searching, and editing of the reference environments 100.

Each reference environment 100 is defined by a definition 92. Each reference environment 100 contains a reference list 94 (e.g. document list 94). Each reference environment 100 may be listed as an entry 102 in a reference environment catalog 110. Each entry 102 may include any portion or all of a respective definition 92 corresponding to and useful in identifying a reference environment 100 listed in the reference environment catalog 110.

In general, a user interface 104 in the reference environment manager 90 may interface with the browser 98. Alternatively, a user interface 104 may include a browser 98. Nevertheless, browsers 98 are available in abundance and the user interface 104 provides underlying support for a reference environment manager 90 to interact with a user through a user's choice of browser 98.

A creator 106 includes an executable for creation of the reference environment 100, including providing a definition 92 setting up parameters defining a reference environment 100. A reference environment 100 may be thought of as a data structure for supporting a reference (e.g. document) list 94.

The modifier 108 includes an executable for editing the document list 94. In one embodiment, the modifier 108 may also include executables for modifying the environment definition 92. However, as a practical matter, editing the definition 92 may not be required. Changing a schema defining the environment entries may be problematic. Databases are not easily modified in schema or definition 92 after creation of data 94 according the definition 92 contained therein. Thus, a modifier 108 may principally be used for editing the document 94. Adding and deleting information associated with documents 146 (e.g. 146c, 146d, 146e, etc.) may rely on data stored, retrieved, or identified in a hit list 96.

The browser 98 may include a search engine interface 112. In general, the search engine interface 112 may be a client portion 112 of an internetwork browser search engine 132. Alternatively, the search engine interface 112 may actually be a search engine in its entirety. In one presently preferred embodiment, the search engine interface 112 includes a query generator 114. The query generator 114 includes an executable for obtaining or selecting query operands and operators, and properly ordering such information into a query. Thus, the query generator 114 may provide a query.

A user, either use a browser 98, key in an address, directly connect, or otherwise locate a site 54 of interest. A user may use a browser 98 or a primary search engine to search (e.g. query) an internetwork. An internetwork may or may not host or otherwise include a directory services system for data relating to documents. A primary search engine may be available through (by any means or architecture) a browser 98 to provide a hit list 96. A user may then adapt the information provided in the hit list 96 to search for specific documents 146 at specific sites 54 (generally, nodes 11, 48, 52, 54) in the internetwork 50.

A search engine may typically rely on query information relevant to a user, and will return certain information sought. Information from the query 114, the original hit list 96, or from subsequent searching of documents 146 at a site 54 corresponding to a hit, may be valuable to a user. Thus, in documents of interest, site addresses, query information, or any selected information relating to documents obtained from any site, may be stored in an environment.

In general, the query generator 114 may be used in conjunction with any suitable search engine. Accordingly, the query generator 114 may formulate queries for searching sites 54 over an internetwork 50 for documents 146, searching hit lists 96 for adding entries to a document list 94, searching catalogs 110 to identify entries 102 corresponding to particular reference environments 100, and searching reference environments 100 and document lists 94 for particular documents 146 identified therein.

The navigation module 116 may operate in conjunction with the search engine 112 and query generator 114. The distinction between any search engine (e.g. engine 132), and an interface adapted to engage a search engine, need not confuse the fact that the interface 112 may effectively represent and be called a search engine for the browser. The navigation module 116 is responsible for providing inputs and outputs between a user and the user station 80. For example, a tool palette 118 may provide a selection of buttons 120, (e.g. access to features 120, or tools 120) for operating on menus 122. The navigation module 116 may provide menus 122 containing entries 124 corresponding to operations, data, entries, or the like.

In general, a navigation module 116 may be thought of as a user interface or graphical user interface. The navigation module 116 presents information regarding available data structures and operations available to a user for interacting with those data structures.

The menu 122 may display entries 124. A menu may 122 display, for example, the hit list 96, a list of the entries 102 of the reference environment catalog 110, or the document list 94 of a reference environment 100. Menus 122 may correspond to input and output dialogue boxes provided in the navigaton module 116. For example, data inputs and prompts associated with the creator 106, modifier 108, and the like, may be presented in the tool palette 118, or the substantive display window 126.

Moreover, the navigation module 116 may provide a graphical user interface for interacting with a browser 98 in any available mode. for example, an internetwork search engine 132, and outputs 134 thereof may be navigated. Likewise a directory services search engine 164 may be accessed thereby. Hit lists 136 and inputs 138 thereto, such as the queries 140, may be presented in a menu 122 (e.g. menus 122, or menu window 122).

The substantive display window 126 may be embodied in various formats. The navigation module 116 and the display window 126 may display actual documents 128 (e.g. documents 146). One may note that a document 146, in general, may be any file or data structure. Thus, a document 146 may exist at any level of a hierarchy of a file system. Thus, in general, a document 128 displayed in the window 126 may arise from any of various steps of processing controlled through a navigation module 116. In general, the navigation module may be configured to provide suitable user interfaces and support for viewing, retrieving, or using any text document, application, spreadsheet, and so forth. Providing the selection, copying, cataloguing, browsing, evaluating, and retrieving functions. These major needs can all be met in one currently preferred embodiment, whether or not loading and launching is required.

For example, any menu entry 124 selected by a user may give rise to an associated document 128 to be displayed in the substantive display window 126. In general, the menus 122 and documents 128 may, but need not be, displayed at the same time. Nevertheless, in one presently preferred embodiment, the navigation module 116 permits actuation of tools 120 operating on menu entries 124 to be represented to a user. Meanwhile, the substantive display window 126 may display the underlying substantive documents 128 corresponding to entries 124 concurrently displayed in menus 122.

The internetwork server 86 (See FIGS. 3, 4A) may include a processor 130 for executing certain data structures stored in the memory device 88. In general, an apparatus and method in accordance with the invention may benefit from an internetwork browser search engine 132 providing outputs 134 in response to inputs 138. For example, a hit list 136 may be output in response to a client query 140 resolved by the search engine 132 against operating data 142 such as records 144. The records 144 may themselves be indices, tables, collections, pointers, or the like, referencing other documents 146 (e.g. 146c–146e on various sites 54 (e.g. 54c–54e) over the internetwork 50.

Referring to FIGS. 3–4B, and particularly FIG. 4B, the user station 80 may configured to operate with a directory services system 150. The reference environment manager 90, hit lists 96, browser 98, reference environments 100, and catalog 100 of FIG. 3 may operate with a directory services server 54a substantially as discussed above for an internetwork server 86. However, a directory services system 150 provides additional benefits with or without a file server 54b.

In one embodiment, a directory services server 54a may be connected to a user station 80 over a network 30, or internetwork 50. A directory services service 54a may include a processor 152 for accessing database storage 154 and a memory device 156.

The memory device 156 may contain executables and other data for use by the processor 152. The memory device 156, may also serve as active or dynamic storage during operation of the processor 152 on data structures placed on the memory device 156 from the database storage 154.

The memory device 156 may include directory services databases 158 as object trees 158 containing various objects 160, 162. Container objects 160 may contain leaf objects 162 or other container objects 160.

Typically, a network directory services search engine 164 may be provided as a part of a directory services system 150. Typically, the search engine 164 can locate any object 160, 162, given the name of that object 160, 162. However, search engines 164 typically use a brute force search through the hierarchy 158 or tree 158 of objects 160, 162. Such a search may be time consuming and inefficient. Alternatively, in one embodiment, a search engine 164 may rely on indices to locate objects 162.

In accordance with the invention, a catalog object 168 may be included as an object 162 in a tree 158 or database 158. The catalog object 168 (e.g. reference catalog object 110 or docloc catalog object 168) may be a directory services object 162 in a database 158. Thus, the catalog object 168 may be found by the search engine 164 as any other object 162.

The catalog object 168 may be identical to a reference environment catalog 110. Alternatively, the catalog object 168 may identify or list other objects 170, called document location objects 170 (e.g. Docloc Objects). A document location object 170 may contain information relating to a document list 94, a reference environment 100, or a reference environment catalog 110. However, in one presently preferred embodiment, a reference environment catalog 110 may be a catalog object 168.

The docloc object 170 may serve directly or indirectly. For example, in one currently preferred embodiment, a distinguished name 172 in the catalog object 168 corresponds to a particular docloc object 170 stored in a directory services database 158. The docloc object 170 may contain any desired information concerning a document. Alternatively, the docloc object 170 may point to another location (e.g. docloc table 180) storing the information. A fallback replica of the docloc object 170 may be stored in a location to provide redundancy and reliability of the directory services system 150.

The browser 98, particularly the navigation module 116, may be used to browse or navigate a catalog 110 (e.g. catalog objects 110, 168. The browser 98 may thus be used to find a distinguished name 172 corresponding to a desired docloc object 170 identified therein.

In one presently preferred embodiment, a docloc object 170 may contain only pointing information identifying a corresponding table 180. The table 180 may be one of several document location tables 180 (e.g. docloc tables 180 may operate as lists of documents 128, 146, 184). Accordingly, a docloc table 180 may correspond directly to a document list 94.

However, in general, a reference environment catalog 110 may be a catalog object 168. An entry 102 (see FIG. 3) may identify a specific docloc object 170 (see FIGS. 4B, 13) as a pointing data structure or pointer 170. The docloc object 170 points to a reference environment 100 embodied as a docloc table 180. The docloc table 180 serves as the document list 94 (see FIG. 3). The additional definitions 92 in a reference environment 100 may be embodied in the docloc tables 180, or in other supporting data structures. Thus, each of the entries 182 in a docloc table 180 may represent a particular document 184 (e.g. document 146, 128).

The docloc tables 180 may be collapsed into the docloc object 170 eliminating indirection. The docloc object 170 may be collapsed into (e.g. replaced by, embodied as, limited to) the docloc catalog object 168. However, indirection provided by a docloc object 170 minimizes the processing burden of maintaining docloc tables 180 that are primarily useful locally on a file server 54b or a user station 80. Thus, in one embodiment, a reference environment catalog 110 may be a catalog object 168 with the reference environments 100 being docloc tables 180.

Indirection allows a file server 54b or user station 80 to update the docloc tables 180 locally as documents 184 are altered. Thus, neither the docloc objects 170 pointing to docloc tables 180, nor the docloc catalog object 168 pointing to docloc objects 170 needs to be altered with addition of a particular entry 182 corresponding to a particular document 184. In general, the entries 182 correspond to certain unique identification of documents 184 and associated location information for retrieving the documents 184.

Referring to FIG. 4B, an update utility 190 may be provided preferably outside the directory services system 150. The update utility 190 may include executables for creating, maintaining, or both, one or more docloc tables 180. The update utility 190 may thus include a comparatively active executable for updating document identification and location information in the entries 182. By contrast, the directory services processor 152 may then operate comparatively seldom to create or edit docloc object 170 and docloc catalog objects 168.

In certain embodiments, a docloc object 170 may not require change except when a docloc table 180 itself is deleted or changes its location. Meanwhile, the list 166 of distinguished names 172 of docloc objects 170 may be modified when a docloc object 170 is created or destroyed. By contrast, an entry 182 in a docloc table 180 may be added, deleted, or edited upon changing a location of any document 184 represented in the docloc table 180.

In general, a reference environment object 174 may do or be anything that a docloc object 170 may do or be. Likewise, a reference environment 110 may do or be anything that a docloc table 180 may do or be. In fact, exact equality or even identity is contemplated in certain instances.

However, in one presently preferred embodiment, a docloc object 170 may point to a docloc table 180, while a distinct data structure called a reference environment object 174 points to a distinct reference environment 100. A docloc object 170 is created and maintained to find links to documents using data that is related to a user. The links may be defined in a docloc table 180.

By contrast, a reference environment object 174 is created and maintained to find reference environments 100 by browsing and searching in accordance with information related to the docuements desired. Accordingly, also, reference environment catalog objects 110 are most useful for browsing. A docloc catalog object 168 may be useful for locating links primarily, but may, by its nature, structure, and included information, be useful for browsing, such as an index may be.

In one embodiment, data contained in a docloc object 170 may be similar or identical to data in a reference environment object 174, and both 170, 174 may exist with respect to the same documents. Similarly, the data structures and information of a reference environment 100 may parallel such for a docloc table 180, each including the same documents.

The catalog 110 (which may be embodied as a catalog object 110, generally, and a reference environment catalog object 110, specifically) may list distinguished names 166. Of particular interest here, distinguished names 166 may identify corresponding reference environment objects 174. The distinguished name 166, the reference environment object 174 identified thereby, or both, may also contain certain key information. This information may relate to a respective reference environment 100. Also, linking information may be contained, relating the reference environment object 174 to a docloc table 180, or a docloc object 170 pointing thereto.

Like a docloc object, 170, a reference environment object 174 may contain pointers and other useful data. A reference environment object may point to, and otherwise characterize, a reference environment 100, just as a docloc object 170 may point to a document location table 180.

Thus, a catalog 168, 110, may identify an object 170, 174 for pointing to a table 180, 100. Identification of a docloc object 170 is typically by a distinguished name 172. In general, herein, any of the distinguished names 166 may be referred to as a ditinguished name 166. Data relating to link management or reference environment management may be selected for storage and stored in the data structures 168, 172, 170, 180 or 110, 166, 174, 100, respectively, in any manner that will be beneficial. Certain useful embodiments are illustrated.

A docloc object 170 may be programmed to have attributes and methods enabling it to serve also as a reference environment object 174. Likewise, a docloc table 180 may contain fields in each entry 182 sufficient to serve as a reference environment 100. A docloc catalog object 168 may be programmed to serve also as a reference environment catalog object 110 or a catalog 110 for various purposes.

However, in one embodiment, docloc catalog objects 168, docloc objects 170 identified therein, and docloc tables 180 pointed to, are relied upon for restoring lost links to documents. These data structures 168, 170, 180 may be distinct from, respectively, corresponding reference environment catalog objects 110, reference environment objects 174 listed therein, and reference environments 100 pointed to thereby. The primary purpose of these data structures 110, 174, 100 is supporting management of reference environments.

Either architecture will suffice. The structures 168, 170, 180 may exist alone to service both link management and reference environment management functions. Alternatively these structures 168, 170, 180 may support link management, primarily, with other structures 110, 174, 100 supporting reference environment management, primarily.

Thus, it is proper to think of such pairs of corresponding, functional, data structures (e.g. 168, 110; 170, 174; 180, 100) as illustrating features or attributes of themselves, and optional embodiments or features of each another. Each embodiment may, however, need to store certain distinct attributes or attribute values in order to support distinct, primary, functional purposes for which it is created and maintained.

Thus a catalog object 168, 110 may contain distinguished names 172, 166, whether a docloc catalog object 168 or reference environment catalog object 110. Objects may be directory services objects 160. Each catalog object 168, 110 may be referred to generally as a catalog 110 and need not be an object in every embodiment.

Similarly, the docloc object 170 and reference environment 100 may be similarly structured, having corresponding attributes 380 (see FIG. 14), or lists 94, respectively. Finally, a reference environment 100 and docloc table 180 may be similarly structured with entries 182, 183, respectively, though the links 196d, 196e are more useful for supporting browsing under the reference environment manager 90.

Thus, in summary, what one data structure 168, 170, 180 may illustrate herein or otherwise provide, a corresponding data structure 110, 174, 100, respectively, may provide, in general, and vice versa. However, the features of the data structures 168, 170, 180 of a link management system, need not be imputed to all embodiments of data structures 110, 174, 100 of a reference environment manager 90, and vice versa.

In certain embodiments, a reference environment manager 90, properly authorized, may rely on browsing or searching any available data structure 110, 174, 100 or 168, 170, 180, regardless of the primary functions thereof.

Referring to FIGS. 5–8, additional details of a tool palette 118, document list 94, reference environment manager 90, and the browser 98 are illustrated. The embodiments of FIGS. 5–8 merely illustrate certain features that a user may find convenient. Accordingly, the data structures of FIGS. 5–6 may be implemented in certain preferred embodiments. Certain prior art data structures may be suitable as executables and operating data in the memory device 82, browser 98, and reference environment 100. Nevertheless, the reference environment catalog 110 and the multiple reference environments 100 are unique in any case. Likewise, the reference environment manager 90 is unique in structure and function.

Referring now to FIG. 5, a tool palette 118 may include a selection of buttons 120 representing functional tools 120. Each tool 120 may correspond to a feature or group of features available to a user. Selection of any of the individual tools 192a–192v may result in a presentation of a dialogue box, menu, additional tool palette 118, or the like. That is, each of the tools 192 may result in a nested set of palettes 118 or tools 120 accessible to a user by any suitable user interface.

Although the tool palette 118 appears suitable for interaction with an individual user, access to each of the tools 192 may be automatic. For example, an executable may be processed by the processor 84 automatically, according to a pre-programmed instruction.

In one embodiment, a select 192a may be used to provide a temporary or permanent selection of an entry 124 in a menu 122. Similarly, a create 192b may invoke executables to operate the creator 106. Alternatively, the create 192b may be used as a tool 192b for creating any data structure required by the system 10 (e.g. apparatus 10).

Similarly, a delete 192c, edit 192d, and the like, may effect deletion and editing of any data structure presented to a user or a computer 11. A setup 192e may provide preliminary inputs and supporting inputs for any executable, template, data structure, and the like.

A query 192f may present a query from any search engine. For example, a query 192f may be used to activate a search engine interface 112, a query generator 114, a search engine 132, or directory services search engine 164. Thus, in general, a tool 192 may be mapped to be activated to support a corresponding executable. Tools 120 may be linked to work together.

For example, a filter 192g and sort 192h may be associated with a query 192f. Any list (e.g. lists 94, 110, 122, 166, 180) of information or collection of data may be filtered 192g or sorted 192h. An input 192i, output 192j, format 192k, and zoom 192l may invoke executables to present options, transfer data, and the like, for a user or processor 84 in any suitable manner known in the art.

In the navigation module 116, a next 192m and previous 192n tool may be used to navigate a menu 122 between entries 124. Alternatively, a toggle 192p may provide for a next 192m or previous 192n tool button to step through a menu 122. Stepping may be by a full screen at a time, an entry at a time, a page at a time, or the like.

Similarly, a scroll 192q may provide for a continuous changing of entries 124 in a menu 122 presented. Scrolling tools are well established in the art, and may be effectively used by the navigation module 116 for presenting menus 122 to a user. Similarly, the substantive display window 126 may also be controlled with the appropriate tools in a tool palette 118, as desired.

An environment tool 192r, entry 192s, input 192t, and viewer 192u may select a level of actuation to be provided by any tool 192. For example, an environment button 192r or environment tool 192r, may cause the next tool 192 activated to operate on an environment 100. Similarly, the entry tool 192s may cause a subsequent tool 192 to operate on an individual entry 124, 102, or the like. For example, any data structure 122, 96, 110, 94, 144, 136, 180, 168, or the like, may contain individual entries to be operated on. Thus, the entry tool 192s may control interaction with such a data structure 122, 96, 110, 94, 144, 136, 180, 168 at an entry level.

A template 192t tool may provide access to formatted templates presenting user interactions, information, dialogue boxes, windows, and the like for presenting outputs and receiving inputs with respect to a user. Similarly, a viewer 192u may provide or select between various display windows, such as the substantive display window 126, the navigation module 116, the menus 122, and the like. Thus, a viewer 192u may be used to control displays presented to a user.

The tools 192 represent only a sample. For example, any practical number of tools 192v may be provided in the tool palette 118. Tools 120 may be nested, linked, and the like. Other tools 192v may be provided below or nested within the tools 192 displayed in an individual tool palette 118. Thus, the nature of the tools 192 may be programmed according to the needs of the data structures of FIGS. 3–8, and 10–16, as well as the methods of FIGS. 2, and 9–12. Also, the tools 192 may be implemented with any user interface, graphical user interface, input device, output device, or the like, known in the art, and suitable to a designated function. Likewise, any suitable data structure, whether executable or not, may be configured to implement or support any individual tool 192.

Referring to FIG. 6, a document list 94 (see also FIG. 3) may include multiple entries 194 corresponding to individual documents 184. For example, the entries 194a–194c may represent identifying and descriptive information concerning documents 184. In one embodiment, the document list 94 may include sufficient, unique information obtained from a document 146 retrieved from a site 54 (e.g. see FIG. 4A) that a user need not store the document 146 as a document 184 (e.g. see FIG. 4B).

Rather, a user may rely on a reference environment 100 to sufficiently identify and evaluate a document 146 based on the entry 194 in the document list 94. Note that, in general, a document may actually be any data uniquely identifiable. Document data in the entries 194 is thus sufficient to establish a link to the corresponding document 146, 184.

A document list 94 may include numerous fields 196. For example, an index 196a may contain a unique identifier, or some ordering (e.g. ranking) value. Similarly, a title 196b may include a document title or a useful, shorthand, or descriptive title to be used in a search of the document list 94.

A location 196 may represent important linking information obtained from a hit list 96 from which a particular address of a desired document 146, 184 was obtained. Accordingly, the contents of a location 196c field may be very important. Nevertheless, additional information, may be provided in other fields 196f, to be used in querying 114, 192f, filtering 192g, sorting 192h, and the like, a document list 94.

Meanwhile, addresses 196d, 196e may represent back link 196d and forward link 196e information related to the location 196c. The back link 196d, and forward link 196e may provide instant pointers 196d, 196e enabling the navigation module 116 to immediately present a document 128 (e.g. see FIG. 3) in a window 126 upon selection 192a (e.g. see FIG. 5) of an entry 124 in a menu 122. Thus, the links 196d, 196e may support scrolling 192q and other tools 192 in the navigation module 116.

A reference environment 100 may greatly benefit from having the forward links 196e and backward links 196d (see FIG. 6). These links 196d, 196e enable a browser 98 to navigate the reference environment 100. The browser 98 may then directly retrieve any lists 94, 110, entry data 194, 374 (FIGS. 6, 13) or documents 146, 184 identified in a reference environment 100, without returning to a local site to execute a query or look up linking data. The docloc table 180 does not need these links 196d, 196e for its fundamental purposes.

Certain duplication of data and data structures may be avoided. However, such duplication may be intended and beneficial. To investigate these alternatives, the following explanation, before proceeding to that of FIG. 7, refers to elements illustrated in FIGS. 3, 4a, 4b, 13, and 14.

A docloc object 170 may be identified in a catalog object 168, by a distinguished name 172. In general, any catalog 110, 168, may list distinguished names 166, 172 of entities (data structures, documents, etc.) of interest, along with other pertinent data related thereto.

Recalling FIGS. 3, 4a, and 4b, in view of FIG. 6, an environment entry 102 may typically represent, characterize, identify, and the like, a reference environment 100. The entry 102 may contain a distinguished name 166 of a reference environment 100. To obtain the benefits of indirection, an entry 102 may contain a distinguished name 166 of a reference environment object 174 pointing to a reference environment. Benefits may include, for example, dividing data to minimize changes to reference environment objects 174 and catalog objects 110. Data to be frequently changed may be stored in the entries 194 of each reference environment 100. Thus, the reference environment manager 90 may update the reference environment 100, just as a local update utility 190 may update a docloc table 180. The local update utility 190 may, for example be hosted on a local node 11, and not need or have access to the network directory services system 150. Again, each, the reference environment manager 90 and update utility 190, may be embodied to serve as, be, or be distinct from the other 190, 90.

Thus, the environment entry 102 may typically point to a reference environment 100 by pointing to a reference environment object 174, which in turn points to a reference environment 100. Pointing could be done directly, but a directory services system 150 need not be burdened with maintaining the reference environments 100 as directory services objects 160.

In an alternative, integrated embodiment, the entry 102 may identify or point to a docloc object 170 pointing to a docloc table 180 serving as a reference environment 100. Thus, the entries 182 (e.g. 380 in FIG. 14) may correspond to, or actually be embodied as, the entries 183 (e.g. 194 in FIG. 6), or vice versa.

In certain alternative embodiments, a list 94 of links, or a document list 94 (e.g. see FIGS. 3, 6, 14) may be generalized to a reference list 94. Accordingly, each entry 183, 194 may be, identify, describe, or the like, a reference. The reference may be a document 146, 184, or a data structure containing certain information corresponding to such a document 146, 184. In one simple embodiment, an entry 183, 194 clearly identifies enough data for a user to determine the suitability of a document 146, 184 for some purpose and to retrieve the document 146, 184 during or subsequent to such a determination.

For example, a document 184 may be an index of other documents 146. A document 184 may be a hit list 96. A hit list 96 contains a list of addresses corresponding to various sites 54c–54e, 86. Thus, a reference list 94 may include entries 194 identifying individual documents 184, or data structures at a higher or lower level in a file system or directory services system 150. Nevertheless, one currently preferred embodiment of a document list 94 includes entries 194 identifying specific, identifiable files 184 or documents 184 by location 196c and other descriptive field data 196b–196f.

Figure 7:
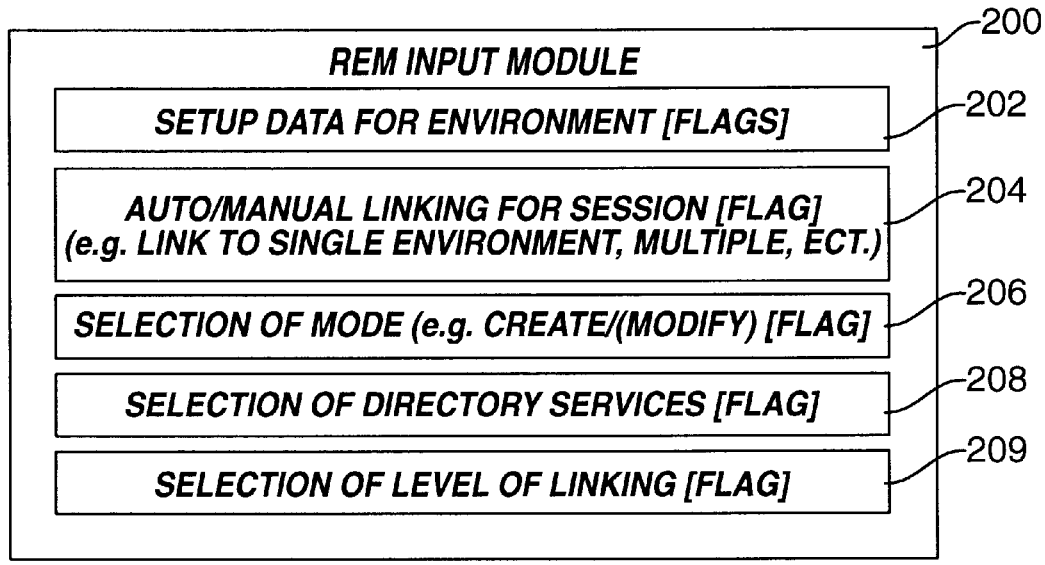
FIGS. 7–8 are a schematic block diagrams of certain embodiments of data structures for supporting inputs and outputs through a user interface of FIG. 3.

Referring to FIG. 7 (and recalling FIGS. 3–6), a user interface module 104 may rely on or include various data structures to support the reference environment manager 90.

In one embodiment, a setup data for environment module 202, or setup 202, may contain executables for providing a template 192t and associated inputs 192i and outputs 192j required for a definition 92 of a reference environment 100.

For example, a name, type, description, security, access list, dates, version numbers, and the like may be associated with a description 92 or definition 92 of a reference environment 100. The setup 202 may provide the executables for obtaining and properly implementing such inputs. Likewise, the setup 202, and the user input module 200, in general, may operate with the navigation module 116, tool palette 118, and menus 122.

The auto/manual linking module 204 or autolinking 204, may implement a user's selection of automatic and manual features to be implemented during a session. For example, the reference environment manager 90 may provide numerous menus 122 in conjunction with the creator 106 and modifier 108. The user interface 104 may rely on executables in the autolinking 204 to automatically bypass or select certain selections 124 in menus 122.

For example, a user may determine that the creator 106 is not to be used during a session. Accordingly, all inputs and controls for the creator 106 may be automatically provided or bypassed in accordance with inputs invoked by the autolinking module 204. Thus, a single reference environment 100, or multiple reference environments 100 may be used for an entire session. All documents 184 to be added to a document list 94 may be automatically added to a single, designated, reference environment 100. The autolinking module 204 may present a template 192t of options to be selected 192a by a user to minimize redundant operations during a session.

A selection of mode module 206, or mode selection module 206, may set a flag and supporting data to control use of the creator 106 and modifier 108. The autolinking 204 may also provide flags that control the selection 206.

For example, if a reference environment 100 is to be created and used exclusively during a session, the mode 206 may begin with a flag to invoke the creator 106. After execution of the creator 106, the modifier 108 may be exclusively invoked to add entries 194 to the document list 94.

In one embodiment of an apparatus and method in accordance with the invention, a selection of network directory services 208, or selection 208, may be available. For example, the embodiment of FIG. 4A and the embodiment of FIG. 4B, may be implemented in a single system. A selection 208 may determine whether the directory services system 150 available through a directory services server 54a will be relied upon, or an internetwork server 86 will be relied upon. Any or all of the modules 202–209 may be provided, optional, or unavailable.

The selection 209 may provide a level (e.g. context level) for linking. For example, a document may be identified by a path and name. A path may provide a context comprising several levels of designation, including drives, volumes, directories, sub-directories, and so forth. A link may be to any such level, and thus may correspond to any of these context designations, such as a volume, a directory, a subdirectory, or a document (e.g. file).

A document 184, 146, a site 54, a docloc object 170, a catalog 68, 110, and the like, may be linked to one another or to another document, such as an application. In one presently preferred embodiment, a document 146, 184 is linked directly by an entry 194 in a document list 94. The list 94 is included in a reference environment 100. The reference environment 100 may be represented by an entry 102 in a catalog 110.

Figure 8:
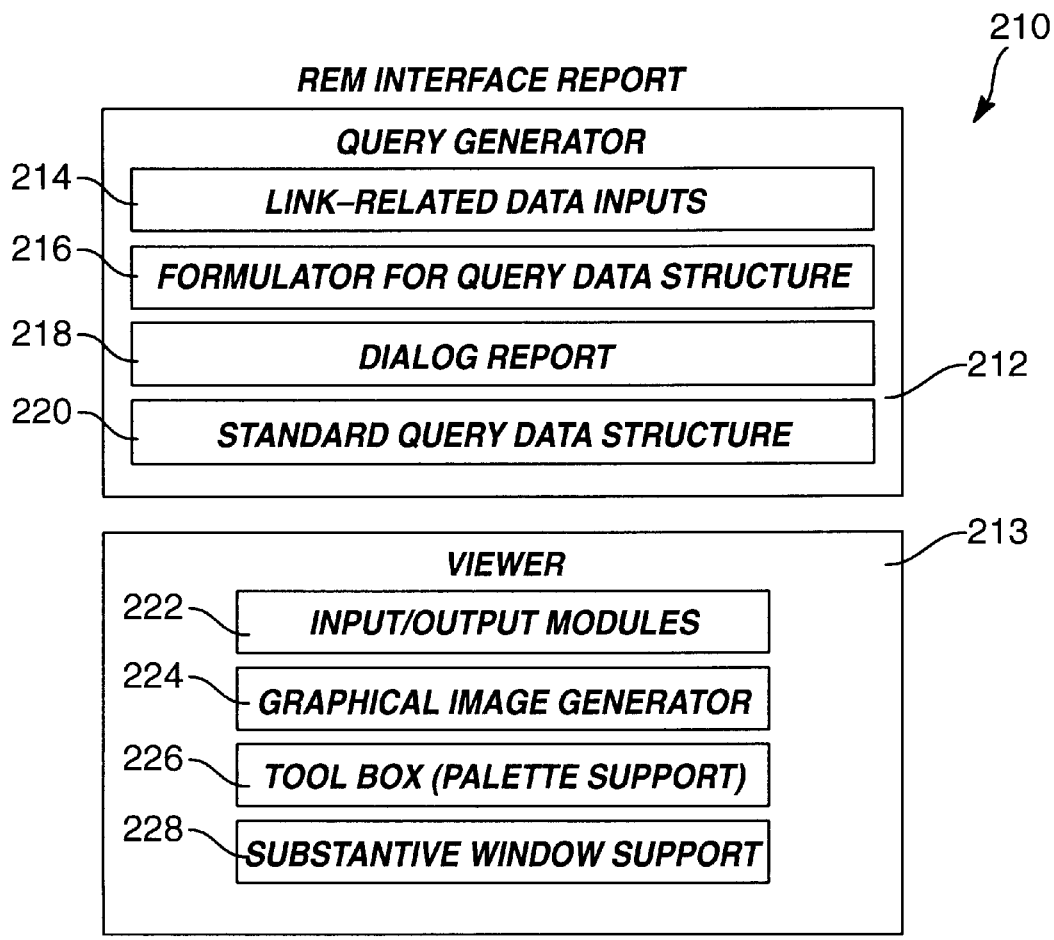

Referring to FIG. 8, a reference environment manager 90 (REM), may benefit from a REM interface support module 210. The reference environment manager support module 210 may operate in conjunction with, within, or in place of a user interface 104, browser 98, or both. For example, a conventional browser 98 need only interface with the REM 90. A custom browser 98 could be built in as the user interface 104.

A query generator 212 may include a link-related data inputs module 214 for managing inputs used to generates queries. A formulator module 216 may provide templates 192t, logical operators, dialogue boxes, or the like, supporting operation of data structures to develop a query or a query data structure based on user inputs.

Any user inputs and outputs may be displayed in a dialogue box created, managed, activated, or otherwise supported by a dialogue support 218. Similarly, any query generator 114, 212 may provide a standard query data structure 220 as an output.

The standard query data structure 220 may include search criteria as operands. The standard query data structure 220 may also include the operators and associated logical delimiters for querying.

In certain embodiments a template 192t may be invoked to display a standard logical structure, into which only certain criteria may be injected as operands. In such a case, the standard query data structure 220 may be composed primarily of operands and linking data to fit those operands into the query logic provided. In certain embodiments, an application may even be spawned to support viewing of document. This may be done using meta data associated with certain files as additional information beyond, or as part of, the standard query data structure 220.

The viewer 213 may include input/output modules 222, graphical image generators 224, tool box support 226, and substantive window support 228. That is, the browser 98, user interface 104, may require executables 222 to support an input 192i and output 192j tool. For example, each of the tools 192 in the tool palette 118 may invoke certain supporting executables to receive and respond to inputs and outputs. Modules 222 may support such inputs and outputs.

Underlying the browser 98 are several executables 224, 226, 228. If a browser 98 is not provided with a reference environment manager 90, then a third-party browser 98, or a client browser 98 associated with an internetwork browser 132 may be relied upon. In either event, a graphical image generator 224 may be provided to support access by the reference environment manager 90 to the features available in the browser 98. For example, readers and drivers may be provided for supporting certain, standardized, graphical file formats on output devices 24, such as monitors 42, etc.

Accordingly, the graphical image generator 224 may include executables required to support use by the reference environment manager 90 of any or all features of the browser 98. Typically, what is needed is support for linking to standard, available, software to accomodate standard formats.

A tool box 226 may include executables, buffers, or other data structures required to support the underlying operation of the tools 192 available in the tool palette 118. Likewise, a substantive window support 228 may include executables for providing documents 146, 184 to the substantive display window 126 from the reference environment manager 90.

Figure 9:
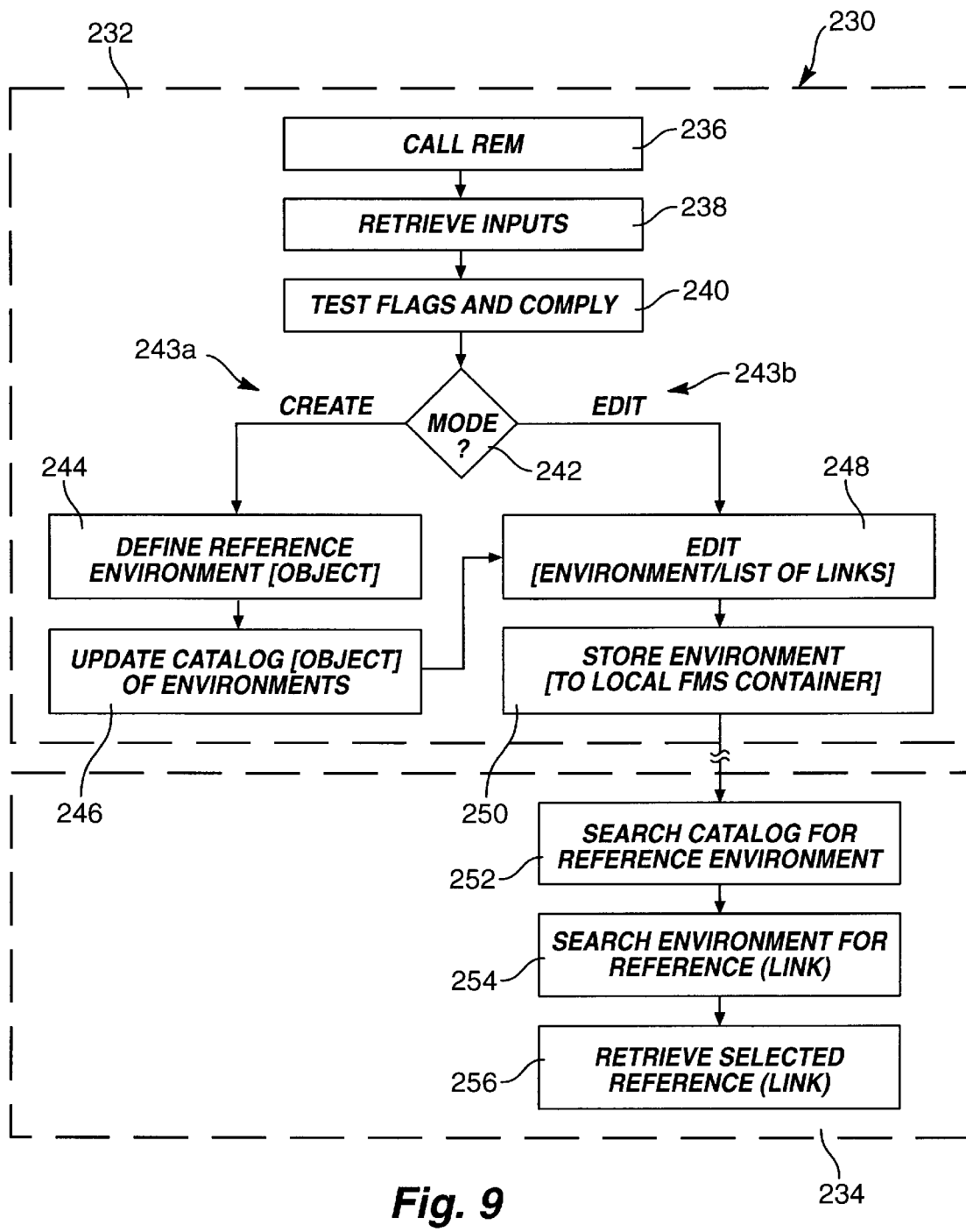
FIG. 9 is a schematic block diagram of one alternative embodiment for a method for implementing creation and modification of reference environment in accordance with the apparatus, methods, and data structures of FIGS. 1–8.

Referring to FIG. 9, a method 230 implementing a reference environment manager 90 may include an environment creation process 232 and a use process 234. In certain embodiments, the use process 234 may be conducted by the browser 98. If the reference environment manager 90 creates reference environments 100 and document lists 94 in a suitable format, an available browser 98 may conduct a use process 234.

Alternatively, the use process 234 may be embodied as an executable in the reference environment manager 90. Nevertheless, in one presently preferred embodiment, the creator 106 and modifier 108 may produce and modify, respectively, reference environments 100 that may be browsed, searched, and otherwise navigated by the browser 98.

The method 230 may include a call 236 to the reference environment manager 90. The call 236 may typically execute the user interface 104. Again, the user interface 104 may rely on the interface support 210, the browser 98, or both.

A retrieve inputs step 238 may obtain inputs from a user through selections from a menu 122 presented to a user. Alternatively, dialogue boxes, may be presented in the menu 122 or substantive display window 126, for interaction by a user through a tool palette 118. In any event, a retrieve inputs step 238 may provide data for the user input module 200, such as flags, setup data, configuration parameters, and the like.

The test module 240 may configure execution of the reference environment manager 90 and the creation process 232 in accordance with the inputs 202–209 provided in the retrieve step 238. The test module 240 complies with all flags set in the user input module 200. A test 240 may be provided within, or in addition to, the test module 240. The test 242 may determine a mode of operation of the process 232. The creator 106 corresponds to a create mode 243a. The modifier 108 corresponds to an edit mode 243b.

The create mode may include a define step 244 and an update step 246. The define step 244 defines a reference environment 100. In the embodiment of FIG. 4B, the reference environment 100 optionally (e.g. see square brackets, FIG. 11) may require creation of certain objects 170, 168. Thus, the define step 244 may include definition of any of the required reference environment catalog objects 110, reference environment objects 174, and reference environments 100.

The update step 246 may include updating a reference environment catalog 110 to include an entry 102 identifying a newly created reference environment 100. Likewise, in the embodiment of FIG. 4B, the update 246 may include updating the catalog object 110 in the directory services system 150.

The reference catalog object 110 may be updated to include a distinguished name 166 corresponding to a reference environment object 174 pointing to the newly created reference environment 100. After the update step 246, the create mode 243a may return to the edit mode 243b. Note that the define step 244 and update step 246 may create any required reference environment objects 174, reference catalog objects 110 or other data structures 100 within or without a directory services system 150.

The edit mode 243b may include an edit step 248, and a store step 250. The edit step 248 is responsible to edit entries in a document list 94 (e.g. FIG. 3) associated with a reference environment 100. Editing may include adding, deleting, modifying, and the like, entries 194, in a document list 94 (e.g. FIG. 6). Editing of the definitions 92 of particular reference environments 100, may be best achieved by including, the functions of a define step 244 in the edit step 248. Thus, in one embodiment, the define step 244 may include editing functionality for a reference environment 100 with associated reference environment catalog objects 110 and reference environment objects 174, as appropriate. Thus, the edit step 248 may support editing of the environment 100 (e.g. by altering the definition 92), list 94, or both 92, 94.

The store step 250 may typically store a reference environment 100, with supporting data, definitions 92, and a document list 94. A reference environment 100 may be stored to a local file management system (FMS). For example, a reference environment may be stored on a local, user station 80, or a remote server 54a, 54b.

In the embodiment of FIG. 4B, storing 250 a reference environment 100 may include storing a reference environment object 174 to a proper container object 160 in a directory services database 158. Likewise, a reference environment catalog object 110 may be stored to a proper container 160 in a directory services database 158.

Where indirection is provided from a reference environment object 174 to a reference environment 100 outside the directory services system 150, the store step 250 need not affect the entries 183 in a reference environment 100 (see FIGS. 4b, 6). Nevertheless, data identifying a location of a reference environment 100 may be saved by a store environment step 250.

A use process 234 may include a search 252 of a catalog 110, a search 254 of an environment 100, and a retrieve 256 of a selected document 184 identified in an entry 183, 194 from a document list 94. A search engine associated with the browser 98, may be used. For example, the internetwork browser search engine 132, directory services (DS) search engine 164, search engine interface 112, and navigation module 116, may be used, as appropriate.

For example, the search 252 of a catalog 110 will identify an environment 100. The environment catalog 110 may list or point directly to an environment 100, which may or may not be an object. However, in the embodiment of FIG. 4B, the catalog object 110, in directory services 150 may point to a reference environment object 174. The indirection of a reference environment object 174 may require vectoring through the reference environment object 174, identified by a distinguished name 166 in the catalog object 110, to find a corresponding reference environment 100. A docloc catalog object 168, docloc object 170, and docloc table 180 may be similarly accessed, searched, and browsed, if available.

Typically, the search step 254 of a reference environment 100, may occur outside of a directory services system 150. The search step 254 is not seeking to locate an environment. Rather, the search 254 seeks data identifying a references (link) listed in an environment 100. Environments may include a docloc table 180, one kind of environment 100.

For example, an entry 183 may be found in a reference environment 100. Typically an entry 183 may be embodied as the entry 194 selectable from a list 94 of references (e.g. links, linking data, identifiers, etc.).

The retrieve reference step 256 may retrieve an entry 182, 194 identifying a desired document 184, 146 into a menu 124 or substantive display window 126. However, the retrieve step 256 may actually provide the complete document 184, 146 to be stored in a local user station 80 or displayed to a user as a displayed document 128.

Figure 11:
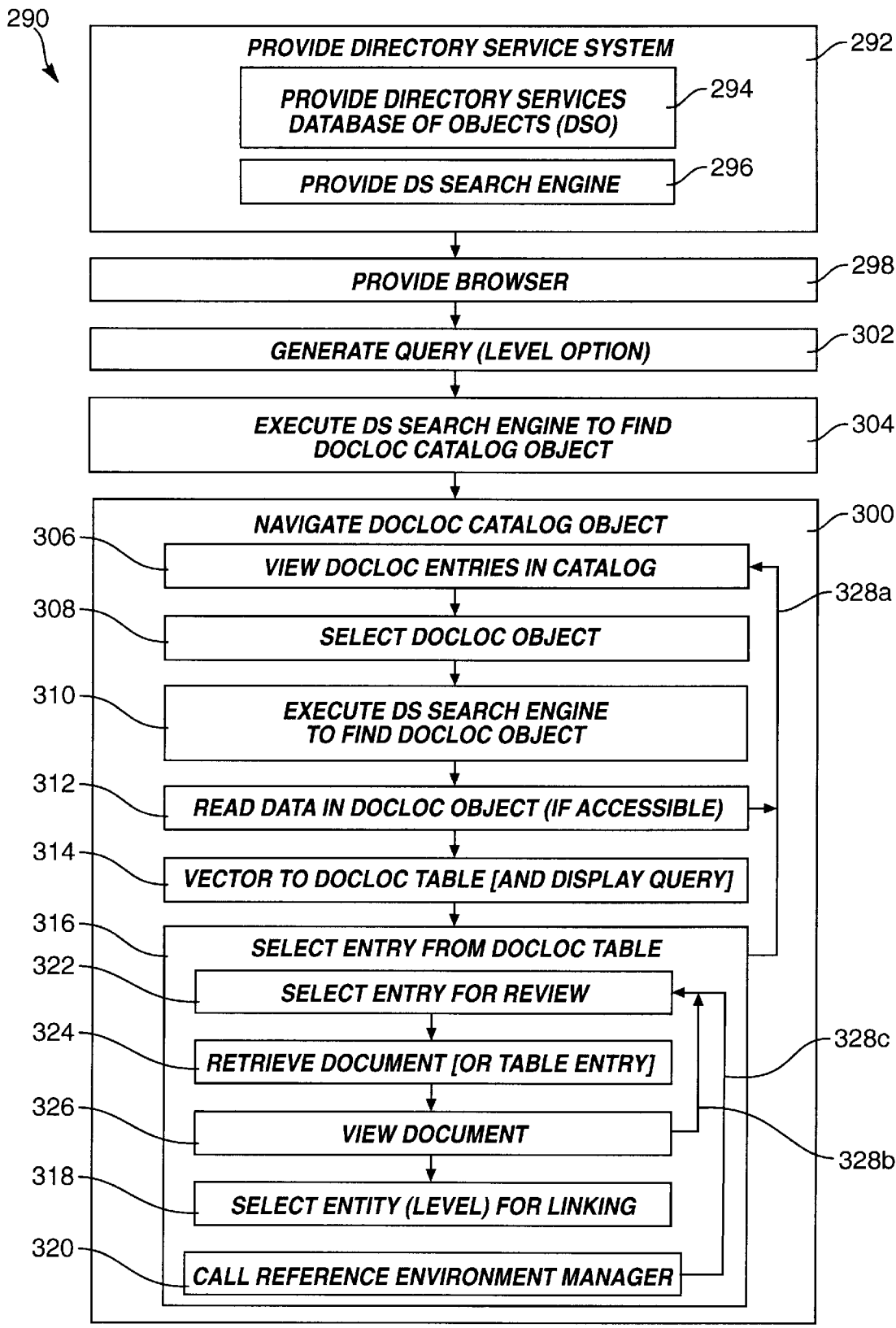
FIG. 11 is a schematic block diagram of one embodiment of a method for creating a reference environment of FIG. 4B.

Referring to FIGS. 10–11, details of the reference environment manager 90 are shown. A creation module 106, or creator 106, may be implemented in any of several ways. For example, a browser 98 may rely on several different search engine interfaces 112 to deal with different types of files (e.g. HTML, HLP, etc.).

The embodiment of FIG. 3 with FIG. 4A may be particularly well adapted to the process 260 of FIG. 10. The embodiment of FIG. 3 with FIG. 4B may be well adapted to the process 290 of FIG. 11.

Referring to FIG. 10, (and still relying on FIGS. 3 and 4A), the creation process 260 may include a provide step 262. The step 262 may provide, for example, a primary search engine 112, 132 or the like. A provide database step 264 may result in records 144 that may include documents 146, or information unique thereto, as data 142 to be operated on. Database storage 89 may provide records 144, associated, selected information, or the like, as needed by the search engine 132.

A provide browser step 266 may include providing 266 a user interface 104 or navigation module 116 for querying or engaging the search engine 132. However, the provide step 266 may typically include providing 266 an entire browser 98 having a search engine interface 112 and query generator 114 to operate with a primary search engine 132.

A generate query step 268 may engage the query generator 114 resulting in a client query 140 provided to a computer 54 networked as, for example, the internetwork server 86. Note that in the Figures, an illustration of a step may also represent a data structure created by the step. For example, the step of generating 268 a query 140 may also represent, and be referred to as, a query 268 generated thereby.

In certain circumstances, any internetworked, searchable, computer 11, 52, 54, 86 may be thought of as a server 54. The execute step 272 may execute the primary search engine 132 to search the database storage device 89, or records 144 available therein, to satisfy a query 140, 268.

The execute search step 272 may engage a search engine 262 to resolve the query 268 reflected by the query data structure 270. The result of the execute search step 272 may be a hit list 136 presented 274 to a user. The present hit list step 274 may typically be executed by the same browser 98 or another. A previously obtained hit list 136 may be displayed (or otherwise presented) to a user as a menu 122 or an individual document 128.

A navigate process 276 or navigate step 276 may include copying, transferring, or otherwise making available a hit list 136 to the browser 98. A hit list 136 typically contains addresses of sites 54c–54e. Sites 54c–54e in the hit list 136 are those from which documents 146c–146e were found to satisfy the query 140. The navigate step 276 may include a select address step 282 in which a user or processor 84 selects from a menu 122 representing a hit list 136, an entry 97 corresponding to an address of a desired document 146. The select address step 282 may provide a temporary selection for browsing or evaluating a document 146 available at a selected site 54.

A view document step 284 may actually retrieve a document 146e from a site 54e corresponding to an address 97 in a hit list 96, 136 displayed by the navigation module 116. For example, a document 146e, or certain identifying information associated therewith, may be displayed in the display window 126 as a document 128.

A user may then further engage the navigation module 116, tool palette 118, and search engine 112, or another underlying portion thereof, to support browsing with the navigation module 116. The navigation module 116, including tools 120, menus 122, and the window 126, may be used to view 284 the document 128. If the document 128 displayed is determined not to be of immediate interest, a user may return to the select step 282.

Alternatively, a document 128 of interest may result in a select document step 278. The select document step 278 may indicate, such as by setting a flag, or the like, that a document 128 retrieved is to be saved to a reference environment 100.

Note that the document 128 displayed may be all, part, or identifiers only, corresponding to an actual document 146. Accordingly, a run step 280, running or calling the reference environment manager 90, may save the document 128, or indicia thereof, to a document list 94 in a reference environment 100. Thereafter, the navigate process 276 may return to select 282 another address associated with a new document 146 at the same or a different site 54.

Referring to FIG. 11, (with reference to FIGS. 3 and 4B, also) a process 290 may be implemented to take advantage of the embodiment of FIG. 4B. The process 290 may be thought of as a process 290 for creation of reference environments 100. The process 290, may include a provide step 292. The provide step 292 results in access by a user station 80 (e.g. node or client 11) to a directory services system 150. The provide step 292 may typically include providing 294 a directory services database 158 of objects 162. The objects 162, actually directory services objects 162, are stored and retrievable over a network 30, 50. In general, a directory services system 150 is unique in providing access to directory services objects 162 (DSO) over a network 30, 60.

Providing 292 a directory services system typically includes providing 296 a directory services search engine 164. The search engine 164 typically can locate any directory services object 162 by a distinguished name within a directory services database 158.

Providing 298 a browser 98 may include interfacing a browser 98 with the directory services search engine 164. Similarly, generating 302 a query may rely on operators and operands defined by a primary search engine 164, or some other search engine 112. Note that a query generator 114 and a resolver 112, 132, 164 therefore need not be integrated nor separated as illustrated herein. Functionality may be provided in any suitable architecture, create and resolve a query.

In general, a search engine interface 112 may include an interface to the DS search engine 164, but may also be capable of searching any document 128 or other data structure presented. For example, in general, the search engine interface 112 may be either all or part of a search engine. In one embodiment the interface 112 may simply provide a useful interface between a user or the browser 98 and a primary search engine 164, such as the DS search engine 164.

However, in one presently preferred embodiment, the search engine interface 112, or simply search engine 112, may be programmed to search data structures unique to the invention. The search engine 112 may be tasked to search or browse through a document list 94, multiple reference environments 100, reference environment objects 174, reference environment catalogs 110, or all of these 100, 174, 110.

A reference environment object 174 is preferably structured to contain information for pointing to a reference environment 100. A reference environment object 174 may include a method for vectoring to a reference environment 100 identified in and corresponding to the reference environment object 174. The reference environment 100 may then be searched by the search engine 112 or other query resolver.

Thus, a primary function of a reference environment object 174, as well as of a docloc object 170 is to point. The information therein may be browsed if desired. However, a reference environment object 174, or a docloc object 170, does not need to be searched.

If available, docloc catalog objects 168, docloc objects 170, and docloc tables 180 may be browsed also. Again, the basic analogs discussed above may be applied in either direction between docloc-oriented data structures 168, 170, 180 and reference-environment-oriented structures 110, 174, 100, respectively. Thus the steps 306–318 of FIG. 11 beneficially apply the foregoing procedures to searching or browsing docloc catalogs 168, docloc objects 170, and docloc tables 180.

Note that generating 302 a query may include one or more levels. A query may be directed to a docloc object 170 to be located in a catalog object 168, or a reference 182 in a docloc table 180. A query may even be highly automated and virtually transparent in a browser 98 displaying any of the foregoing in menus 122.

A query may be directed to finding a proper document list 94 in a reference environment 100, with or without any intervening indirection. However, indirection provides processing efficiencies for both the comparatively global directory services system 150 (e.g. objects 160) and the comparatively local reference environment manager 90 (as well as the update utility 190). Indirection supports division and assignment of comparatively global and local responsibilities from one another. Division of comparatively global and local data structures may be according to their frequency of being accessed. Global systems (e.g. directory services) need not manage details of local data structures (e.g. reference environments 100, docloc tables).

Executing 304 a search by the DS search engine 164 may locate a docloc catalog object 168, typically by distinguished name 172. Here, using one case as analog for both, navigating 300 a docloc catalog object 168 may involve several searches.

Initially, navigating 300 may include viewing 306 distinguished names 172. Distinguished names 172 of docloc objects may be listed as entries 124 in a catalog object 168. The list may be displayed as a menu 122.

Selecting 308 a docloc object 170 from a catalog 168 in order to search or browse a docloc table 180 may be done before any reference environment exists. FIG. 2 illustrates a process 60 for use of a reference environment manager 90 with its associated (or included) browser 98. However, a directory services system 150 may exists, and have a link management system using docloc catalogs 168, docloc objects 170, and docloc tables 180. A reference environment manager 90 may obtain information therefrom to create and manage reference environment catalogs 110, reference environment objects 174, and reference environments 100.

For example, in one presently preferred embodiment, a docloc object 170 points to one and only one docloc table 180. The docloc object 170 may be sufficiently described in a directory services catalog object 168 to facilitate a search thereof by a browser 98. In addition to a distinguished name 172 corresponding to a docloc object 170, other descriptive information may be searchable in the docloc catalog object 168. Thus, a docloc object 170 may be identified and searchable by its nature, and uniquely identified by its distinguished name 172. Likewise, a docloc table 180 may be queried, browsed, searched, and the like to identify virtually any information useful for selecting references for inclusion in a reference environment 100, with associated reference environment object 174 and reference environment catalog 110. All such data structures 100, 174, 110 may be created, in certain embodiments, by using this directory services information instead of hit lists 136.

Executing 310 the DS search engine 164 will locate a docloc object 170 corresponding to a distinguished name 172 selected from a catalog object 168. Reading 312 data from the selected docloc object 170 may be completed by the browser 98 with or without the search engine interface 112, depending on architecture.

Multiple, special-purpose browsers 98 may be included in certain embodiments of an apparatus and method in accordance with the invention. Alternatively, using the reference environment manager (REM) interface support modules 210, a single browser 98 may be adapted to all search and navigation functions required to implement the invention. Note, in passing, that reading 312 may be contingent on access rights available to a user station 80 and so identified, for example in a docloc object 170.

A docloc object 170 may vector 314 to a corresponding docloc table 180. Optionally, (e.g. as indicated by brackets, FIGS. 11, 12) the docloc table 180 may be displayed as a menu 122, a document 128, or both. Similarly, the docloc table 180 may be queried using the search engine interface 112, navigation module 116, or both, as needed.

Selecting 316 an entry 182 from the docloc table 180 and selecting 318 a level for linking (e.g. reference, document, volume, sites, etc.) may be implemented by or through the browser 98. If an entry 182 or document 184 satisfies criteria controlling the selection 316, at a hierarchical or file system context level selected 318, a call 320 may invoke the reference environment manager 90.

The call 320 may engage the reference environment manager 90 in any appropriate mode to create 243a or modify 243b a reference environment 100, or to identify a selected document entry 194. As discussed with respect to FIGS. 4–9 above, the reference environment manager 90 may create 243a and edit 243b either definitions 92 or content 94 of reference environments 100, whether or not a directory services system 150 is available.

Selecting 322 an entry 182 for review may present information identifying a particular document 184. Retrieving 324 a document 184, whether identified in an entry 182, or constituted by the entire table entry 182, itself, may be achieved using the tool palette 118. For example, one may select tools 120 to select 192a and view 192u an entry 182. Thus, viewing 326 a full document 184 or entry 182 corresponding thereto may be accomplished using the browser 98.

In viewing 326, a user may determine that a document 184 is indeed not of interest. Accordingly, a repeat 328b to a selecting step 322 may be executed. Selecting 322, retrieving 324, and viewing 326 may be done by executables automatically based on criteria established programmatically or by a user. If a document 184, or entry 182 proves unsatisfactory, this process 316 may return from the viewing step 326 to the selection step 322.

Note that the selecting step 316 may include a facility for returning 328a (looping 328a) to the viewing step 306. Likewise, viewing 326 may loop 328b, and running 320 may loop 328c, to additional executions of the selection step 322. Reading 312 and selecting 316 an entry 182 from a docloc table 180 may continue by looping 328a back to a viewing step 306 and selecting 308 other docloc objects 170, with the looping 328b, 328c, nested therein.

Figure 12:
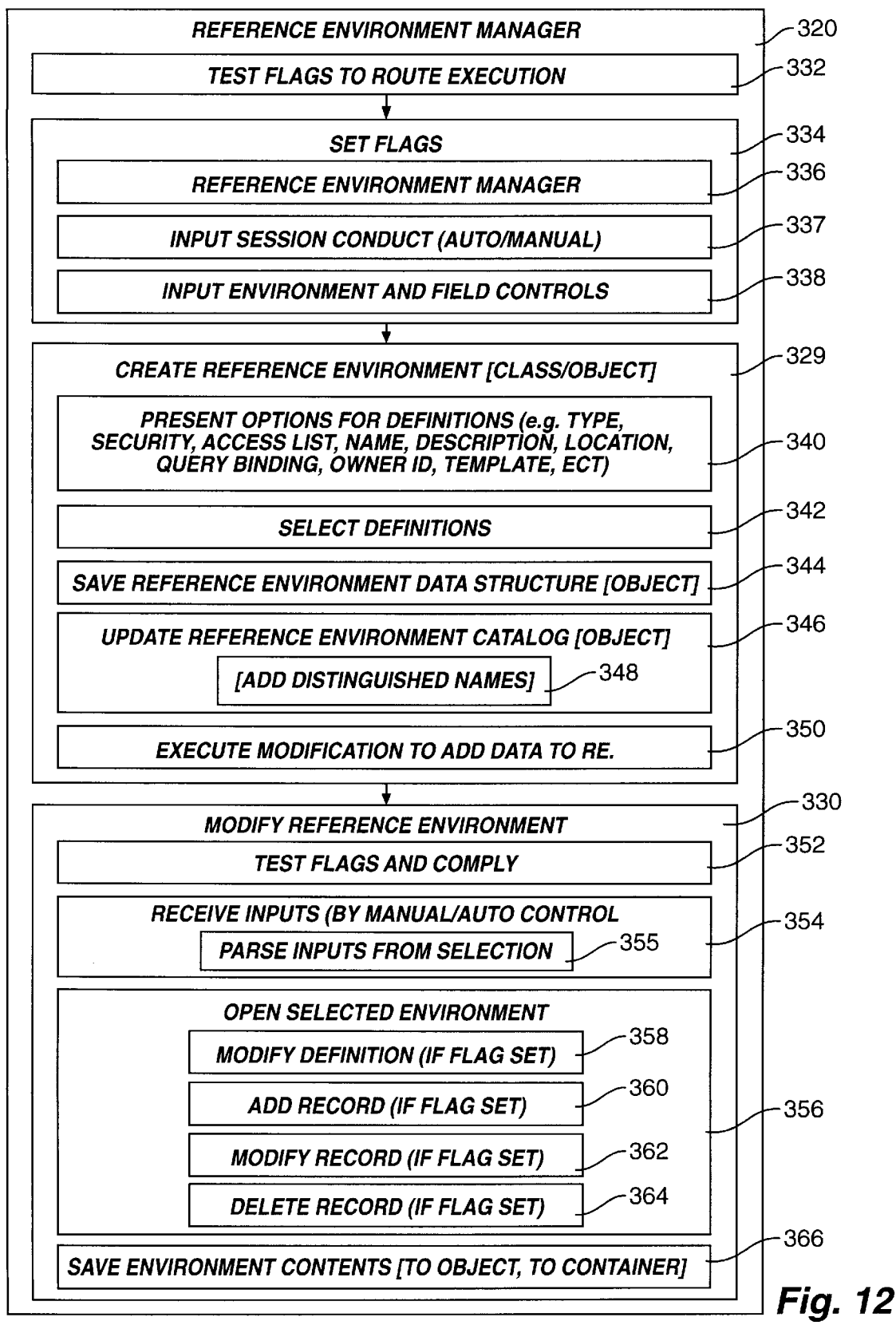
FIG. 12 is a schematic block diagram of one embodiment of a method and corresponding data structures, implementing the reference environment manager of FIGS. 2–4 and 10–11, in accordance with the invention.

Referring to FIG. 12, running 320 the reference environment manager 90 is illustrated to describe both the running step 280 (see FIG. 10, corresponding to FIGS. 3, 4A) and running step 320 (see FIG. 11, corresponding to FIG. 3, 4B). Bracketed (optional) features apply to the embodiment of FIGS. 4B, 11. FIG. 3 may apply to both of these embodiments.

In one presently preferred embodiment, testing 332 flags set according to user preferences, may route execution of the reference environment manager 90. However, if flags have not been set, then setting 334 certain flags described below, may be invoked.

Otherwise, testing 332 may result in routing execution of the process 320 to either a create process 329 (e.g. executing a module 106) or modify process 330 (e.g. executing a module 108). Setting 334, (the set flags step 334) may include inputting 336 a flag or selector designating an operational mode 243a, 243b. Operational modes 243 include a create mode 243a and an edit mode 243b. The create mode 243a corresponds a to the creating process 329 and the creator 106. The editing mode 243b corresponds to the modify process 330 and the modifier 108.

Inputting 337 session conduct may control whether the reference environment manager 90 operates automatically, manually, or in some combination of manually and automatically. For example, linking, discussed above, may be set to occur in a specific manner, with documents 146, 184 or links 182, 194 (e.g. entries 182, 194) saved to a specific, single environment 100 throughout an entire session. Alternatively, certain, selected information may be input manually while other information is handled automatically.

Inputting 338 environment and field controls may be directed primarily to the creator 106 and creating step 329. For example, a definition 92 of a reference environment 100 may be fixed, variable, input once only, provided but editable, input with each search or other activity, or the like. Similarly, field controls may influence the format or content of fields in individual entries 182, 194, and fields 196 to be included in a document list 94, including a docloc table 180. Thus, controlling inputs for determining whether, how, and when, a definition 92 or the fields 196 are to be input, altered, fixed, stepped through, or the like, may be determined by inputting 338 environment and field controls.

Setting 334 flags and controls may include a host of other inputs. These inputs may control features of the browser 98, the reference environment manager 90, the reference environments 100, reference environment objects 174, reference environment catalogs 110, and the like.

Creating 329 a reference environment 100 may be accomplished using a tool palette 118 and menus 122. For example, a file management system of a user station 80 or server 86 may be accessed to create 329 the desired data structures 100, 174, 110. Alternatively, creating 329 a reference environment 100, with corresponding reference environment objects 174 and reference environment catalogs 110, may require definition or creation of classes and objects in a directory services system 150.

Creating 329 a reference environment 100 may include presenting 340 options for definitions 92. For example, a type of reference environment 90 may relate to access, function, or the like. Similarly, security information affecting local and global access, access lists relating to persons, organizations, and the like, may all be included. A name, one or more descriptions of a reference environment 100, as well as a location (path), and owner identification may be useful, or required.

Query binding may set up data structures within a reference environment 100 in order to save query operands (e.g.

search parameters) as key words describing or indicating the nature of a reference environment 100. For example, if a reference environment 100 is created from a search directed to certain queries, information about the queries may be saved and used to identify or explain the corresponding reference environment 100 storing the search results. Likewise, template information may link a reference environment 100 with navigational features, such as various tool palettes 118, menus 122, and display graphics for the window 126.

Presenting 340 options for creating definitions 92 may be preferable to requiring a user to engage in complex determinations of details of data structures. That is, creating certain standard options may standardize the creation process 329.

Selecting 342 a definition 92 may directly follow presenting 340 limited, appropriate, high-level options. Saving 344 a reference environment data structure 100 may involve a straightforward selection or execution of a tool 120 (e.g. selection 192*a*).

However, in the embodiments of FIG. 4B, and FIG. 11, saving 344 a reference environment 100, 180 may include determining a container 160 into which a reference environment catalog 110 may be placed. Similarly, a reference environment object 174 must be placed in a suitable container 160, not necessarily the same nor a different container 160. In certain embodiments, a reference environment 100, itself, may be an object 160 stored in a directory services system database 158. In such a circumstance, a container 160 for the reference environment 100 may be selected.

Updating 346 a reference environment catalog 110 may require addition of an entry 102 corresponding to a new reference environment 100. In the embodiments of FIGS. 4B and 11, the catalog object 110 may be updated by the directory services processor 152 according to conventions of the directory services system 150. Likewise, updating 346 may include updating a reference environment object 174 whose distinguished name 166 must be added 348 to a reference environment catalog object 110.

Executing 350 the modification 108 (e.g. modifier 108) to add data to a reference environment 100 is optional in the creating process 329 (e.g. creator 106). Modifying 330 (executing the modifier 108) may be done at any time after creating 329 a reference environment 100.

In many instances, creating 329 may be done specifically to accommodate modifying 330 reference environments 100. Examples include adding entries 183, 194 to a docloc table 180 or document list 94, respectively.

Modifying 330 a reference environment 100 may include testing 352 flags for controlling compliance therewith, equivalent to the testing 332. Receiving 354 inputs may rely on various sources, as appropriate. Inputs may be received 354 manually, automatically, or by a hybrid of both methods. Similarly, input mechanisms may be set manually, for automatic receipt 354 of inputs. The receiving process 354 may include parsing 355 larger data structures into useful subdivided pieces.

Opening 356 an environment 100 may be controlled by the set flags step 334. Accordingly, a user may modify 358 a definition 92, add 360 an entry 194 modify 362 an entry 194 or fields 196, or delete 364 an entry 194. A user may then save 366 the reference environment 100. Note that the reference environment manager 90 may service a reference environment 100, updating entries 194, much as an update utility 190 may update the entries 182 in a docloc table. However, the creator 106 and modifier 108 are preferably tasked with providing definitions 92. An update utility 190 may or may not provide a definition for a docloc table 180.

Referring to FIG. 13, a docloc object 170 may have a distinguished name 172 as one of its attributes 374. The distinguished name 172 may be stored in the docloc object 170. Alternatively, a docloc object distinguished name 172 may simply be identified elsewhere by an address location or a pointer to the location in memory 156 containing the docloc object 170.

In general, a docloc object 170, as other objects 162, may include attributes 374 and methods 368. Attributes 374 and methods 368 need only be provided as required according to the purpose of a particular object 162, such as the docloc object 170. In one embodiment, a docloc object 170 may contain only attributes 374.

In one currently preferred embodiment, a docloc object 170 may contain several fields 372 (e.g. 372*a*–372*i*). For example, an attribute index 372*a* may provide an identifier for a particular attribute name 372*b*. An attribute name 372*b* may be, or correspond to, an easily identifiable identification in natural language.

Meanwhile, a source ID 372*c* may indicate an identifier, path, or other pointer to identify either a source of the attribute name, by document, file, application, or the like, or an source in a memory device. Certain flags 372*d* may be identified with particular attribute names 372*b*.

Similarly, a syntax 372*e* may be identified for reading a type of an attribute 374. Attributes, for example, may be of a string, integer, path, number, or other type.

An upper 372*f* and lower bound 372*g* may be used to store limits on a range of values that an attribute 374 may take on. An assignment ID 372*h* may be provided as may any additional flags 372*i*. Flags 372*i* may indicate either a mandatory or optional nature of a particular attribute 374.

Some of the attributes 374 that may be useful in an apparatus and method in accordance with the invention are identified as the attributes 374*a*–374*k*. For example, a title 374*a* may be descriptive of a docloc object 170. A language attribute 374*b* may identify either a computer language or a natural language associated with a docloc object 170.

Another attribute 374 may be a version 374*c*. A version 374*c* may identify certain controlling numbers identifying the most recent updating of a docloc object 170 or the docloc table 180 associated therewith. In one presently preferred embodiment, the version 374*c* may relate to the docloc object 170, and not to updates of the docloc table 180, due to the relatively higher frequency of updates required for the docloc table 180. A description 374*d* may provide information further explaining the nature of a docloc object 170.

One valuable attribute 374*b* is a path 374*f* or doclocation path 374*f* identifying the context or path associated with a docloc table 180 corresponding to a docloc object 170. The path 374*f* may actually include the file name associated with a docloc table 180. Alternatively, the path 374*f* may include only the context, such as a network identification, a server or storage device identifier, a volume identifier, and a path leading up to the name 374*e* as the last element for the most detailed element of a path. Thus, the name 374*e* and the path 374*f* may operate together to completely define or identify a docloc table 180 corresponding to a docloc object 170.

A style 374*g* may be included as attribute 372*b*. The style 374*g* or Docpublication style 374*g* may identify a particular, identifiable style adhered to by a particular docloc table 180. Styles may include, for example, HTML, HELP, TEXT, application documents, etc. Similarly, a type 374*h*, or multiple types 374*h*, associated with a docloc table 180, or with each of the documents 146, 184 identified in a docloc table 180 may be stored in a type attribute 374*h*.

A security attribute 374*i*, alternatively referred to as a Docsecurity attribute 374*i*, may identify local, global, cryptographic, or other security information associated with a docloc table 180 and enforced or communicated by a docloc object 170. For example, attributes 374*i* may include draft, confidential, public, etc. access controls.

A fallback attribute 374*j* may identify the existence and locations of duplicates, replicas, fallbacks, and the like, corresponding to the docloc object 170. Data identifying the existence of a fallback docloc object 170 may be beneficially contained in a docloc object 170 to be provided upon breaking of a link to a document retrievable through use of a docloc object 170.

Other attributes 374 may include an object class 374*k*. The object class 374*k* may identify the type of object 162, which in this case is a docloc object 170. Other information that may be of use to a user or to a link management module 90 may be included as a attribute 374.

Referring to FIG. 14, a document location table 180 or simply a docloc table 180 may contain information fields 376 directly related to the docloc table 180, the docloc object 170 corresponding to the docloc table 180, the binding therebetween, or the like. A path 374*f* and name 374*e* (see FIG. 13) in a docloc object 170 may provide certain binding to the docloc table 180.

The docloc table 180 may include such indication within itself organically, such as a docloc ID 376*a*. The ID 376*a* may include a distinguished name, a full path, or the like. Similarly, a docloc table 180 may include other binding data 376*b*. For example, a name, or a group of names of docloc objects 170 that are related or pointing to a docloc table 180 may be included as binding data 376*b*. In one presently preferred embodiment, no information 376 regarding the docloc table 180 may be required within a docloc table 180. The corresponding docloc object 170 may contain all binding or pointing data.

Thus, a docloc table 180 may or may not be able to identify a docloc object 170 to which it is bound. Nevertheless, in alternative embodiments, both a docloc object 170 and a docloc table 180 may contain mutual binding data, 374*f*, 376*b*, respectively.

In one embodiment, a docloc table 180 may itself be an object. For reasons discussed previously, such a docloc table 180 might still be resident outside of a network director, services database 158. Nevertheless, appropriate methods and attributes 376*c* may be included in the docloc table 180. Even if a docloc table 180 is not configured as an object, certain attributes 376*c* may be desirably maintained within the docloc table 180. Likewise, certain codes or commands representing certain executables 376*d* may be incorporated within the docloc table 180, whether or not the docloc table 180 is encapsulated within an object, certain document information 382 relates directly to individual documents 146, 184 identified in a docloc table 180. For example, multiple fields 376 may identify documents 146, 184 with sufficient specificity to uniquely identify them. For example, an index 382*a* may be local or global.

A file name 382*c* and a path 382*d* may be provided. A unique ID 382*b* may or may not include the name 382*c* and context 382*d* of a document entry 182. The ID 382*b* may still specifically and uniquely identify any particular document 146, 184 represented in a docloc table 180.

Any other attributes 380 of interest to a user, or of some functional use, may be included as attributes 382*e*. For example, the attributes 374 of the docloc object 170 of FIG. 13 may be suitable examples of attributes 382*e*. Such attributes, in a docloc table 180 corresponding to documents 146, 184, may include, for example, an owner's name, dates, title, associated application, etc. Certain of the attributes 374 may also be selected for a docloc object 170 to directly relate to all documents of the docloc table 180 pointed to by such a docloc object 170. This reduces the number of required attributes 380 in the docloc table 180 in certain circumstances.

By contrast, the attributes 382*e* may include many of the same attributes 374, of the docloc object 170. Various attributes 374, 380 may identify similar or the same information concerning length, security parameters, access, links, link types, pointers, file types, application identifiers, and the like, corresponding to particular documents 146, 184.

The file name 382*c* and path 382*d* identify uniquely any document 146, 184 referenced in a docloc table 180. Accordingly, in one embodiment in accordance with the invention, a docloc table 180 may include only a file name 382*c* and a path 382*d* for any individual entry 380. The reference numerals 380, followed by trailing alphabetical characters, may be thought of as individual instances of the same generic entry 380 item. Thus, the individual entries 380*a*–380*e* are merely particular instances of a generic entry 380.

Referring to FIG. 15, and also FIG. 3, a query generator 114, 212 may be implemented in a variety of configurations. For example, a browser 98 may provide a display window 126 and a tool palette 118 for accessing tools 120, discussed above with respect to FIGS. 3 and 5. Construction of a query 390 may be done within the bounds of predicate calculus and to any degree of transparency to a user. Common query generator details, beyond those discussed is herein, are available elsewhere in the art.

In one embodiment, the query generator 114, 212 may include an obtain inputs step 386 or executable 386 to obtain inputs relating to a document 146, 184 (e.g. reference). The obtain inputs step 386 or executable 386 may be programmed to be controlled in part of entirely by the tool palette 118. The palette 118 may be used to operate on entries 124 in menus 122 displayed by the browser 98 or another display mechanism. A user may thus identify information effective or likely to uniquely identify a document 146, 184 sought.

The provide operator step 388 may occur in response to the nature of the inputs available, or may be determined in advance. For example, operators may be provided that are arranged in a standard query format, a standard template, or the like. Thus, the available operators for a query generator 212 and standard query data structure 220 may be limited. Alternatively, user interaction for deterministic logic, or the like may be used to provide operators 388, operands 389, or both.

Operands may be provided in a provide operands step 389 or executable 389. For example, tokens, pointers, values, and, the like to be operated on by operators 388 may be provided in the provide operands step 389. Note that each of the steps 386–390 may be thought of as a step in the process executed by a query generator 114, 212, but may also be viewed as the data provided thereby or used therein.

For example, the illustration of the obtain input step 386 may also be thought of as a representation of the inputs themselves. Similarly, the representation of the provide operator step 388 may be thought of and discussed as the operators 388 themselves. Likewise, the element signifying the provide operands step 389 may be thought of and discussed as the operands 389 themselves.

The nature of the operands 389 is determined by the nature of a document 146, 184. For example, a title, a user identification, certain words of text, a document type or the like, may provide inputs 386 that may eventually be parsed or reformed by the create step 390. Alternatively, the provide operands step 389 may directly extract and use certain inputs 386 provided by a user as operands to be fitted to a standard query 390.

It is unnecessary here to describe all of the available operators associated with predicate calculus. Boolean, logical, relational, aggregation, comparator, and other types of operators 388 are available. Thus, any suitable amount of user interaction or automation may be provided for creating 390 a standard query 390.

Referring to FIG. 16, a standard query 390 (see FIG. 15) may be so standardized, in one embodiment, that operators 388 are fixed in a template or the like. Accordingly, a standard query data structure 220 may be all that is required.

For example, the operands 389 may be defined by the create step 390 to identify information such as a reference environment catalog 110 reference environment object 174, reference environment 100, distinguished name 166, docloc object 170, docloc object distinguished name 392, document name 394, reference type 396, and the like. The distinguished name 392 may be used to search using the directory services search engine 164 for a docloc object 170. An entry 182 identifying any document 146, 184 reflected in a docloc table 180 pointed to by that docloc object 170 may then be identified. Similarly, the inputs 386 for a query generator 114, 212 (see FIG. 15) may provide a document name 394 corresponding to a document 146, 184 sought.

A link type 396 may be identified. Link types may be associated with help types of files, dynatext books and collections on books, or HTML unique resource locator (URL). Link types 396 may be extremely informative. A link type 396 may both identify some limited subset of available documents 146, 184 to be considered, and may provide information regarding other data that may be available for reestablishing a link. For example, the nature of a link type 396 may itself dictate the availability of certain associated information. Relationship data 397 may be included in a standard query data structure 220.

Relationship data may include, for example, an identification of an owner of a file. Similarly, dates, whether creation, modification, expiration, or the like, may be included. Likewise, titles and key words likely to be associated with documents (or references thereto) may be included in the data structure 220.

Of particular interest is information associated with original criteria for selecting and saving a particular document 146, 184. Such information may be available through a docloc object 170 or docloc table 180. The information may also be of interest for creation of a reference environment 100. Other standard or customized data 398 may be included in a standard query data structure 220.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for managing reference environments, the apparatus comprising:
    a computer readable memory device storing a plurality of reference environments associated with a user, each reference environment containing entries, each entry reflecting a document,
    the computer readable memory device storing data structures further comprising:
        a network directory services system comprising directory services objects operably related in a hierarchical tree, each directory services object corresponding to an entity, and the hierarchical relationships corresponding to the relationships between the entities;
        a location object, being an instance of a directory services object, containing reference environment attributes, and identifying the reference environments, for controlling access to the reference environments by a user in accordance with the reference environment attributes; and
    a processor for executing a reference environment manager programmed to create, manage and modify the plurality of reference environments, the reference environment manager being independent from the directory services system and effective to create and modify the entries, and for executing a browser for navigating the plurality of reference environments.

2. The apparatus of claim 1, further comprising a server operably connected to a plurality of sites operably connected by an internetwork, each site storing documents, and the server being programmed to provide to the processor a hit list identifying selected documents selected from the documents in response to a query.

3. The apparatus of claim 2, wherein the server is further programmed to run a search engine for processing the query and providing the hit list to the processor.

4. The apparatus of claim 3, wherein the browser is executable to provide to the reference environment manager selected document information corresponding to selected documents identified by the browser from the hit list, for inclusion in a selected reference environment.

5. The apparatus of claim 1, wherein the reference environment manager further comprises:
    a creator module for creating a plurality of reference environments;
    a modifier module for modifying reference environments; and
    the browser is further programmed to selectively search, sort, and filter the reference environments and the entries therein.

6. The apparatus of claim 1, wherein the reference environment manager further comprises a modifier module for modifying entries in each of a plurality of reference environments and for modifying a definition of the each reference environment.

7. The apparatus of claim 1, wherein the memory device further stores at least one reference environment catalog identifying the plurality of reference environments, and wherein the reference environment manager is programmed to navigate the at least one reference environment catalog.

8. The apparatus of claim 7, wherein:
    the at least one reference environment catalog is an object in a directory services database of objects accessible over a network; and
    the memory device stores a reference environment object listed in the reference environment catalog and pointing to the each reference environment for providing indirection.

9. The apparatus of claim 1, wherein the processor is operably connected to a directory services system for managing a directory services database containing directory services objects, and wherein the reference environment is pointed to by a reference environment object in the directory services database.

10. The apparatus of claim 9, wherein the directory services database stores document location objects pointing, respectively, to document location tables, and wherein the browser is executable to navigate the document location objects to identify a document according to information related to the document and stored in the document location tables.

11. The apparatus of claim 1, wherein each entry of a reference environment of the plurality of reference environments further comprises a backlink, for identifying a previous entry, and a forward link, for identifying a subsequent entry, and wherein the browser is executable to select and retrieve directly documents corresponding to the entry, previous entry, and subsequent entry.

12. A directory services browsing system, comprising data structures stored in a computer-readable medium, the data structures comprising:

a network directory services system comprising directory services objects operably related in a hierarchical tree, each directory services object corresponding to an entity and, the hierarchical relationships corresponding to the relationships between the entities;

a directory services database containing directory services objects, the directory services objects including a catalog object programmed for containing distinguished names;

a document location stable structured for instantiation independent from the directory services system and in correspondence with reference environments containing a list of references corresponding to documents and effective to uniquely identify the documents;

a document location object, an instance of a directory services object programmed for control, maintenance, and instantiation by the directory services system for corresponding to the document location table and pointing to the document location table;

a reference environment manager programmed to create, manage and modify reference environments in accordance with inputs from a user for access in accordance with the document location object.

13. A computer readable medium storing data structures for managing reference environments, the data structures comprising:

a reference environment manager programmed to create, manage and modify reference environments;

a network directory services system comprising directory services objects operably related in a hierarchical tree, each directory services object corresponding to an entity and, the hierarchical relationships corresponding to the relationships between the entities;

a document location table, structured for instantiation independent from the directory services system and in correspondence with the reference environments to contain a list of references corresponding to documents and effective to uniquely identify the documents;

a document location object, being an instance of a directory services object programmed to be controlled, maintained, and instantiated by the directory services system for corresponding to the document location table and for pointing to the document location table.

14. The article of claim 13, wherein the reference environment manager further comprises a creator and a modifier for executing the creating and modifying, and wherein the creator is further programmed to create definitions defining, respectively, the reference environments.

15. The article of claim 14, wherein the modifier is further programmed to modify the definitions, respectively, of the reference environments.

16. The article of claim 13, wherein each entry of a reference environment of the plurality of reference environments further comprises a backlink, for identifying a previous entry, and a forward link, for identifying a subsequent entry, and wherein the browser is executable to select and retrieve directly documents corresponding to the entry, previous entry, and subsequent entry.

17. The article of claim 13, further storing executables effective to:

provide a reference environment containing references;

provide a catalog of reference environments;

navigate the catalog to select a selected reference environment;

navigate the reference environment to select a reference; and retrieve directly a document corresponding to the reference.

18. The article of claim 13, wherein the data structures further comprise a document location table storing information for identifying and selecting a document.

19. The article of claim 18, wherein the data structures further comprise a document location object pointing to the document location table.

20. The article of claim 19, wherein the data structures further comprise a catalog object containing a list of distinguished names of objects for browsing.

21. A method for managing reference environments, the method comprising:

providing a network directory services system comprising directory services objects operably related in a hierarchical tree, each directory services object corresponding to an entity, and the hierarchical relationships corresponding to the relationships between the entities;

providing a reference environment manager programmed to create, manage and modify reference environments;

providing a document location table, configured for instantiation independent from the directory services system and in correspondence with the reference environments to list references corresponding to documents and to uniquely identify each of the documents;

providing a document location object, an instance of a directory services object programmed for control, maintenance, and instantiation by the directory services system to correspond and point to the document location table.

* * * * *